United States Patent
Furui et al.

(10) Patent No.: US 8,485,673 B2
(45) Date of Patent: Jul. 16, 2013

(54) METHOD FOR PRODUCING OPTICAL LAYERED BODY, PRODUCTION APPARATUS OF OPTICAL LAYERED BODY, OPTICAL LAYERED BODY, POLARIZER AND IMAGE DISPLAY DEVICE

(75) Inventors: Gen Furui, Tokyo (JP); Yukimitsu Iwata, Tokyo (JP); Takashi Kodama, Tokyo (JP); Yoshihiro Nishimura, Tokyo (JP); Koichi Mikami, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 606 days.

(21) Appl. No.: 12/377,711

(22) PCT Filed: Aug. 16, 2007

(86) PCT No.: PCT/JP2007/065966
§ 371 (c)(1),
(2), (4) Date: May 1, 2009

(87) PCT Pub. No.: WO2008/020612
PCT Pub. Date: Feb. 21, 2008

(65) Prior Publication Data
US 2010/0097705 A1    Apr. 22, 2010

(30) Foreign Application Priority Data

Aug. 18, 2006  (JP) ................................. 2006-223523
Aug. 18, 2006  (JP) ................................. 2006-223525

(51) Int. Cl.
G02B 27/00  (2006.01)
G02B 13/20  (2006.01)
G02B 5/02  (2006.01)

(52) U.S. Cl.
CPC ................................... *G02B 5/0278* (2013.01)
USPC .......................................... 359/601; 359/599

(58) Field of Classification Search
USPC .......................................... 359/599, 601–614
See application file for complete search history.

(56) References Cited

U.S. PATENT DOCUMENTS

| | | | | |
|---|---|---|---|---|
| 4,373,282 A | * | 2/1983 | Wragg | 40/546 |
| 5,847,795 A | * | 12/1998 | Satoh et al. | 349/137 |
| 5,998,013 A | | 12/1999 | Shoshi et al. | |
| 6,217,176 B1 | * | 4/2001 | Maekawa | 359/601 |
| 6,992,827 B2 | * | 1/2006 | Sakai et al. | 359/599 |

(Continued)

FOREIGN PATENT DOCUMENTS

| | | |
|---|---|---|
| JP | 6-016851 | 1/1994 |
| JP | 6-018706 | 1/1994 |

(Continued)

*Primary Examiner* — Thong Nguyen
(74) *Attorney, Agent, or Firm* — Novak Druce Connolly Bove + Quigg LLP

(57) ABSTRACT

A method for producing an optical layered body which can attain properties such as an antiglare property, scintillation prevention and black color reproducibility such as gloss blackness simultaneously, and a production apparatus of the optical body are provided. The method includes forming an antiglare layer having a surface roughness on the light-transmitting substrate, wherein with respect to the surface roughness, when denoting a mean spacing of profile irregularities of the surface of the optical layered body by Sm, a mean inclination angle of profile irregularities by θa, and mean roughness of the surface roughness by Rz, Sm is 50 μm or more and less than 100 μm, θa is 0.1° or more and 1.0° or less, and Rz is more than 0.2 μm and 1.0 μm or less.

15 Claims, 7 Drawing Sheets

U.S. PATENT DOCUMENTS

| | | | |
|---|---|---|---|
| 7,271,862 B2 * | 9/2007 | Matsunaga et al. | 349/64 |
| 7,839,570 B2 * | 11/2010 | Iwata et al. | 359/599 |
| 2003/0197939 A1 | 10/2003 | Tsuchimoto et al. | |
| 2004/0233350 A1 * | 11/2004 | Kawanishi et al. | 349/96 |
| 2005/0063062 A1 * | 3/2005 | Ito et al. | 359/599 |
| 2005/0163977 A1 * | 7/2005 | Miyatake et al. | 428/195.1 |
| 2005/0207016 A1 * | 9/2005 | Ando | 359/586 |
| 2006/0215079 A1 * | 9/2006 | Suzuki et al. | 349/96 |
| 2007/0231566 A1 * | 10/2007 | Yoneyama et al. | 428/331 |
| 2007/0247710 A1 * | 10/2007 | Nakashima et al. | 359/485 |

FOREIGN PATENT DOCUMENTS

| | | | | |
|---|---|---|---|---|
| JP | 7234304 | | 9/1995 | |
| JP | 10-180950 | | 7/1998 | |
| JP | 2000-210618 | | 8/2000 | |
| JP | 2004-341070 | | 12/2004 | |
| JP | 2005-227407 | | 8/2005 | |
| JP | 2006-30983 | * | 2/2006 | 359/601 |
| JP | 2006-145587 | | 6/2006 | |
| TW | 528894 B | | 4/2003 | |

* cited by examiner

Prior Art $$Ra = \frac{1}{l} \int_0^l |f(x)| \, dx$$

$l =$ Cut off value  3 times or more (basis)

METHOD FOR PRODUCING OPTICAL LAYERED BODY, PRODUCTION APPARATUS OF OPTICAL LAYERED BODY, OPTICAL LAYERED BODY, POLARIZER AND IMAGE DISPLAY DEVICE

CROSS REFERENCE TO RELATED APPLICATIONS

This application is a National Stage of PCT/JP2007/065966 filed Aug. 16, 2007 which in turn claims priority from Japanese Application 2006-223523 filed Aug. 18, 2006 and Japanese Application 2006-223525 filed Aug. 18, 2006, the entire contents of which are incorporated herein by reference.

TECHNICAL FIELD

The present invention relates to a method for producing an optical layered body, a production apparatus of an optical layered body, an optical layered body, a polarizer and an image display device.

BACKGROUND ART

In image display devices such as cathode ray tube (CRT) display devices, liquid crystal displays (LCD), plasma displays (PDP), and electroluminescence displays (ELD), generally, an optical layered body for antireflection is provided on the outermost surfaces thereof. Such an optical layered body for antireflection inhibits the reflection of images or decreases a reflectance by virtue of scattering and interference of light.

As one of such optical layered bodies for antireflection, an antiglare layered body, in which an antiglare layer having a surface roughness is formed on the surface of a transparent substrate, is known. Such an antiglare layered body can prevent the reduction in visibility due to reflection of external light or reflection of images by scattering external light through a surface roughness of the surface. As an antiglare layered body, a layered body in which a surface roughness is formed with particles (Patent Document 1), and a layered body in which a surface roughness is formed by performing emboss molding treatment (Patent Documents 2 and 3) are known.

In recent years, with an increase of high definition panel resolution, performance required of the optical layered body has been increased. It is thought that an antiglare layered body used for such high definition panels requires a fine surface roughness. That is, by having the fine surface roughness, it is aiming at response to high definition panels. The antiglare layered body having such a fine surface roughness can respond to requirements of high definition panel resolution, however it has pointed to have problems that the image display face looks white (whitening) or contrast is deteriorated.

Further, if such an antiglare layered body is applied to the surface of an image display device such as a personal computer, there is a problem that "scintillation", that is, a state in which when transmitting light from a back side such as a backlight in a display passes though a rough surface of an antiglare layered body formed at the outermost surface of a panel, this light disturbs displayed pixels because the surface roughness of the antiglare layered body can act as a fine lens.

As a method of solving "scintillation", a technique of increasing a density of peaks and valleys of the surface for the purpose of enhancing sharpness, a technique of imparting an internal scattering effect to the antiglare layered body by adding scattering particles having a difference in refractive indexes with a resin composing the antiglare layer and the like are known.

However, such a method of solving "scintillation" is a method causing surface whitening or white cloud due to an internal scattering effect. Particularly in the method of increasing a density of peaks and valleys of the surface, scattering due to external light reflection is increased and whitening increases. Therefore, the antiglare property is good, but this method would be a factor that deteriorates contrast. That is, in conventional antiglare layered bodies, it was difficult to satisfy all of "antiglare property", "improvement of contrast", and "scintillation prevention". Therefore, there may be cases where these antiglare layered bodies are inferior in black color reproducibility including gloss blackness (black as a raven (clear and pure block color)), contrast and the like in a screen display. That is, there may be cases where a difference in gradation of black color is hardly recognized and sensitivity is low in expression of black color tone, particularly in low tone, in a bright room. Specifically, there may be cases where in color recognition between black and gray, sometimes color blur occurs or color tone could not be recognized and recognized as black of the same tone. In the antiglare layered bodies having a good antiglare property=scattering performance of external light, these visibility was significantly deteriorated.

On the other hand, in the antireflection method of based on light interference, techniques of imparting a function by controlling a refractive index or a layer thickness of each layer, such as a method in which a refractive index of a hard coat layer having a clear and smooth outermost surface is increased and a low refractive index thin film is provided on the hard coat layer, are known. In this method, the above-mentioned contrast is good, and the reflection of external substances in a surface of a display screen can be prevented by lowering (e.g., reflection Y value 0.1 to 0.8%) the reflectance without limit. However, this method has difficulties of controlling a layer thickness of a coat and has many problems in terms of production, and most of materials are expensive. Further, if the reflectance is lowered through light interference, interference color is produced, and therefore there was a problem that this interference color discolors white or black color in a screen reddish or bluish even though the reflectance is low. Further, when the reflectance is not so low, prevention of the reflection was sometimes difficult. Furthermore, it has been emerged that even though the reflectance is extremely low, the reflection cannot be prevented depending on an environment in which television is vied. For example, in an interior with white wall, the white wall is reflected as white on the surface of a screen as long as the surface is flat.

Furthermore, it has been emerged that even though the reflectance is extremely low, the reflection cannot be prevented depending on an environment in which a display is viewed. For example, in an interior with white wall, the white wall is reflected as white on the surface of a screen as long as the surface is flat.

Developments of a production method and a production apparatus of an optical layered body provided with a good surface roughness, which can improve these problems and obtain a property of good gloss blackness while achieving an antiglare property and an effect of preventing scintillation, are required.

Patent Document 1: Japanese Kokai Publication Hei-6-18706

Patent Document 2: Japanese Kokai Publication Hei-6-16851

Patent Document 3: Japanese Kokai Publication 2004-341070

DISCLOSURE OF THE INVENTION

Problems to be Solved by the Invention

In view of the above state of the art, it is an object of the present invention to provide a method for producing an optical layered body which can attain properties such as an antiglare property, scintillation prevention and black color reproducibility like gloss blackness simultaneously, and a production apparatus of the optical layered body.

Means for Solving the Problems

The present invention pertains to a method for producing an optical layered body having a light-transmitting substrate and an antiglare layer formed on the light-transmitting substrate, including the step of forming the above-mentioned antiglare layer having a surface roughness on the above-mentioned light-transmitting substrate, wherein with respect to the above-mentioned surface toughness, if denoting a mean spacing of profile irregularities of a surface of the above-mentioned optical layered body by Sm, a mean inclination angle of profile irregularities by θa, and a mean roughness of the surface roughness by Rz, Sm is 50 μm or more and less than 100 μm, θa is 0.1° or more and 1.0° or less, and Rz is more than 0.2 μm and 1.0 μm or less.

The above-mentioned step of forming the antiglare layer may be the step of forming a rough surface layer which is a single layer.

The above-mentioned step of forming the antiglare layer may include the step of forming a rough surface layer which is an under coat layer and the step of forming a surface adjustment layer on the rough surface layer which is an under coat layer.

The above-mentioned formation of the rough surface layer may include the step of integrating an antiglare film having the above-mentioned surface roughness and the above-mentioned light-transmitting substrate (first production method). This antiglare film can be prepared by the following second, third, and fourth production methods.

The formation of the rough surface layer may include the steps of forming a resin layer on the above-mentioned light-transmitting substrate and forming a surface roughness at the surface of the above-mentioned resin layer. A composition for forming the resin layer may include a composition for an antiglare layer, an ionizing radiation-curable resin, or a thermosetting resin (second production method).

In the above-mentioned second production method, the formation of the above-mentioned surface roughness preferably includes the step of performing a molding treatment using a mold having peaks and valleys which has a shape reversed to the surface roughness which the rough surface layer has.

The formation of the rough surface layer may include the step of applying a composition for an antiglare layer onto the above-mentioned light-transmitting substrate (third production method).

In the above-mentioned third production method, the above-mentioned composition for an antiglare layer may contain a resin and fine particles.

In the third production method, the composition for an antiglare layer may be a composition not containing fine particles and containing at least two kinds of components selected from the group consisting of polymers and curable resin precursors.

The formation of the rough surface layer may include the steps of introducing the above-mentioned light-transmitting substrate into a mold having peaks and valleys which has a shape reversed to the surface roughness and introducing a composition for an antiglare layer into a gap between the above-mentioned light-transmitting substrate and the mold surface having peaks and valleys to form a surface roughness on the above-mentioned light-transmitting substrate (fourth production method).

In the above-mentioned fourth production method, the above-mentioned composition for an antiglare layer may be a composition not containing fine particles and containing an ionizing radiation-curable resin or a thermosetting resin.

In the fourth production method, the formation of the rough surface layer may have the step of curing the rough surface layer after the step of forming the rough surface layer.

The present invention pertains to a production apparatus of an optical layered body used for the above first production method, including a supply section to supply the light-transmitting substrate and the antiglare film having a surface roughness; and a formation section to form the above-mentioned antiglare layer on the above-mentioned light-transmitting substrate (first production apparatus).

The present invention pertains to a production apparatus of an optical layered body used for the second production method, including a formation section to form the above-mentioned resin layer on the above-mentioned light-transmitting substrate and provide a surface roughness for the resin layer. A composition for forming the resin layer may include a composition for an antiglare layer, an ionizing radiation-curable resin, a thermosetting resin or the like (second production apparatus).

In the above-mentioned second production apparatus, the above-mentioned formation section preferably includes a mold having peaks and valleys which has a shape reversed to the surface roughness of the rough surface layer.

The present invention pertains to a production apparatus of an optical layered body used for the above third production method, including a supply section to supply the light-transmitting substrate, an imparting section to impart a composition for an antiglare layer to the surface of the light-transmitting substrate, and a formation section to cure the above-mentioned composition for an antiglare layer to form the above-mentioned antiglare layer having a surface roughness (third production apparatus).

In the above-mentioned third production apparatus, the above-mentioned formation section preferably has an irradiation section to irradiate the above-mentioned composition for an antiglare layer with ionizing radiation.

The present invention pertains to a production apparatus of an optical layered body used for the above fourth production method, including a supply section to supply the light-transmitting substrate, a mold having peaks and valleys which has a shape reversed to the surface roughness formed at the surface of the antiglare layer to which the above-mentioned light-transmitting substrate is introduced, an introduction section to introduce a composition for an antiglare layer into the above-mentioned mold, and a formation section to cure the above-mentioned composition for an antiglare layer to form the above-mentioned antiglare layer having a surface roughness (fourth production apparatus).

In the above-mentioned fourth production apparatus, the above-mentioned formation section preferably has an irradiation section to irradiate the above-mentioned composition for an antiglare layer with ionizing radiation.

The present invention also pertains to an optical layered body produced by the method for producing an optical layered body described above.

The present invention also pertains to an optical layered body produced by the production apparatus of an optical layered body.

The present invention pertains to an optical layered body having a light-transmitting substrate and an antiglare layer provided on the light-transmitting substrate, wherein the above-mentioned antiglare layer has a surface roughness at its outermost surface and is formed by using a composition for forming an antiglare layer, containing a resin and fine particles, and a difference in refractive indexes between the above-mentioned resin and the above-mentioned fine particle is 0.2 or less, and if denoting an mean spacing of profile irregularities of a surface of the optical layered body by Sm, a mean inclination angle of profile irregularities by θa, and mean roughness of the surface roughness by Rz, Sm is 50 µm or more and less than 100 µm, θa is 0.1° or more and 1.0° or less, and Rz is more than 0.2 µm and 1.0 µm or less.

The above-mentioned fine particle is preferably an inorganic fine particle or an organic fine particle.

The fine particle may be an agglomerated type fine particle.

The fine particle preferably has an average particle diameter R of 1.0 µm or more and 20 µm or less.

In the antiglare layer, a difference "H−R" between a layer thickness H (µm) of the antiglare layer and an average particle diameter R (µm) of the above-mentioned fine particles is preferably 0.6 µm or more and 15.0 µm or less.

With respect to the fine particle, 80% of the total number of the fine particles preferably falls within an average particle diameter R of the fine particle of ±1.0 µm.

In the above-mentioned antiglare layer, when the total weight per unit surface area of the fine particles is denoted by m and the total weight per unit surface area of the resin is denoted by M, a weight ratio (m/M) is preferably 0.01 or more and 1.2 or less.

The above-mentioned resin preferably contains an ionizing radiation-curable resin and/or a thermosetting resin.

The above-mentioned antiglare layer preferably further contains an antistatic agent.

The above-mentioned antistatic agent is preferably a conductive fine particle and/or a conductive polymer.

The antiglare layer may include a single layer of the rough surface layer.

The antiglare layer may include an under coat rough surface layer and a surface adjustment layer provided on the above-mentioned under coat rough surface layer.

The optical layered body of the present invention preferably further has a low refractive index layer on the antiglare layer.

The above-mentioned low refractive index layer preferably contains hollow silica.

The optical layered body preferably has an internal haze value of 60 or less.

The present invention also pertains to a polarizer including a polarizing element, wherein the optical layered body described above is provided on the surface of the above-mentioned polarizing element opposed to a face where the antiglare layer in the optical layered body is present.

The present invention also pertains to an image display device including a light-transmitting display and a light source apparatus to irradiate the above-mentioned light-transmitting display from the backside, wherein the above-mentioned image display device includes the optical layered body described above or the polarizer described above at the surfaces of the above-mentioned light-transmitting display.

Hereinafter, the present invention will be described in detail.

The present invention pertains to a method for producing an optical layered body, including the step of forming an antiglare layer having a surface roughness on a light-transmitting substrate, and the surface roughness of the surface of the resulting optical layered body has specific Sm, θa, and Rz. Further, the present invention pertains to a production apparatus of an optical layered body having a light-transmitting substrate and an antiglare layer formed on the light-transmitting substrate, and the surface roughness of the surface of the resulting optical layered body has specific Sm, θa, and Rz. Accordingly, when the above-mentioned production method and production apparatus are used, an optical layered body, which can control optical properties and has properties such as an antiglare property, scintillation prevention and black color reproducibility like gloss blackness simultaneously, can be produced.

In the present invention, with respect to the surface roughness of the surface of the above-mentioned optical layered body, if denoting a mean spacing of profile irregularities by Sm, a mean inclination angle of profile irregularities by θa, and a mean roughness of the surface roughness by Rz, Sm is 50 µm or more and less than 100 µm, θa is 0.1° or more and 1.0° or less, and Rz is more than 0.2 µm and 1.0 µm or less.

By adapting Sm, θa and Rz to satisfy these values, effects can be particularly suitably achieved.

That is, the optical characteristics are controlled by controlling the shape of the surface of the optical layered body. Here, the "surface of the optical layered body" means the outermost surface of the optical layered body adjacent to air in any of the cases where the antiglare layer is a single layer, the antiglare layer is composed of the undercoat rough surface layer and the surface adjustment layer, or the optical layered body further has the low refractive index layer and/or arbitrary layer, and optical characteristic values of the surface roughness of the outermost surface are coincident with the optical characteristic values of the surface roughness of the optical layered body in the present invention.

Gloss blackness of an image display device is black color reproducibility in performing black color display in the image display device under a bright-room environment, and it can be evaluated by visual observation. When an reflection angle at the time when incident light to the optical layered body from the outside is reflected covers a wide range, the light is reflected in all directions (diffuse reflected) according to angles of the peak and valley of the surface of the optical layered body and reaches observer's eye, and therefore inherent black color is not reproduced (that is, only a part of diffused light reaches observer's eye). In conventional optical layered bodies, gloss blackness is reduced by forming a surface roughness is due to such causes. The present inventors have made various investigations noting such an action, and controls a shape in such a way that incident light is reflected so as to be concentrated into the vicinity of a specular reflection angle, and whereby light from a light source is seldom diffuse reflected and becomes almost specular reflection light. Therefore, light other than this specular reflection light does not reach observer's eye, and therefore it become as inherent black as a raven (clear and pure black color). Here, a shape, from which incident light is reflected so as to be concentrated into the vicinity of a specular reflection angle, is a gradual surface roughness which is defined by Sm, θa and Rz within specific ranges in the present invention. This gradual surface roughness means a shape in which peaks are like hills with gentle slope and on the other hand, valleys are nearly flat rather than a valley configuration because the valleys are extremely gradual valleys compared with peaks.

On the other hand, in an image display device having the surface of such a surface roughness, light is not without reflection, and since scattering which can inhibit the reflection and the reflection of images on a smooth clear layer occurs, this image display device can also obtain adequate performance in a antiglare property.

The present invention has been completed by finding that in these displays, both of an antiglare property and black color reproducibility can be obtained by controlling a surface roughness of an optical layered body for antireflection to keep reflected-scattered light in a range of certain scattering angles.

In order to achieve gloss blackness and an antiglare property simultaneously through the actions described above, denoting a mean spacing of profile irregularities of a surface of the optical layered body by Sm, a mean inclination angle of profile irregularities by θa, and ten-point mean roughness of the surface roughness by Rz, Sm is set at 50 µm or more and 100 or less, θa is set as 0.1° or more and 1.0° or less, and Rz is set at more than 0.2 µm and 1.0 µm or less, and by setting Sm, θa and Rz within these ranges, a small reflection angle described above can be attained.

The surface roughness satisfying the above-mentioned parameter has a more gradual surface roughness than that in a conventional optical layered body, and therefore diffusion of the reflected light can be more reduced than a conventional antiglare layer. Further, it is estimated that since the optical layered body has such a gradual surface roughness, diffuse reflection of light is suppressed compared with a smooth surface without an antiglare layer and controlled scattering of light occurs within the vicinity of a specular reflection angle.

A schematic diagram of a cross section of the surface of a conventional antiglare layer is shown in FIG. 1a and a schematic diagram of a cross section of the surface of an antiglare layer of the present invention is shown in FIG. 1b.

As shown in FIG. 1a, there are few flat portions on the surface of a conventional antiglare layer and peaks and valleys lie smoothly continuously there. In such a surface, an antiglare property is very excellent, but light is diffused at every location and adequate gloss blackness cannot be attained because there is no flat portion on the surface and the surface is curved everywhere. The reason for this is that a mean inclination angle θa is large.

On the other hand, since the surface, satisfying the above-mentioned conditions of Sm, θa and Rz, of the antiglare layer in the optical layered body obtained by the production method of the present invention, does not have peaks densely and the flat portion exists on the surface as shown in FIG. 1b, gloss blackness can be attained together with the antiglare property.

In addition, an optical microscope photograph (reflective shoot, magnification 200 times) of the surface of a conventional antiglare layer is shown in FIG. 2a and an optical microscope photograph of the surface of an antiglare layer of the present invention is shown in FIG. 2b.

That is, by satisfying all of parameters described above, the surface of the optical layered body obtained by the production method of the present invention has gradual flat portions as a surface roughness of the surface which are not present in conventional antiglare layers, and the angle, which is formed with a bottom of profile valley (flat portion) and a tangent line of a peak of profile peak, becomes very small. Therefore, an optical layered body which keeps both of gloss blackness and an antiglare property suitable can be obtained.

The antiglare layer constituting the optical layered body according to the present invention has a surface roughness. Sm (µm) represents a mean spacing of profile irregularities of the surface roughness of this antiglare layer, θa (°) represents a mean inclination angle of profile irregularities, and (Rz) represents ten-point mean roughness, and their definitions are according to JIS B 0601 (1994) and are also described in an instruction manual (revised on Jul. 20, 1995) of a surface roughness measuring instrument (model: SE-3400, manufactured by Kosaka Laboratory Ltd.)

θa has a unit of angle, and since when an inclination is expressed in the form of a ratio (Δa) of a height to a base, θa can be determined by this equation, Δa=tan θa=(total of the distance of the bottom of local valley of profile and the top of local peak of profile in roughness curve(equivalent to the height of local peak of profile)/reference length).

The reference length is as described in measuring conditions.

When parameters (Sm, θa, Rz) representing the surface roughness of the optical layered body of the present invention are measured, parameters can be measured according to the following measuring conditions using, for example, a surface roughness measuring instrument (model: SE-3400, manufactured by Kosaka Laboratory Ltd.), and this measurement is preferable in the present invention.

Measuring conditions of a surface roughness measuring instrument according to JIS B 0601 1994.

1) Stylus of detection section of surface roughness:
Model: SE 2555N (2 micron standard) manufactured by Kosaka Laboratory Ltd.
(tip radius 2 µm, tip angle: 90°, material: diamond)

2) Measuring conditions of surface roughness measuring instrument:
Reference length (cut off value λc of roughness curve): 1, 0.25 or 2, 0.8 or 3, 1.25 or 4, 2.5 mm
Evaluation length (Reference length (cut off value λc)×5): 1, 1.25 or 2, 4.0 or 3, 6.25 or 4, 12.5 mm
Drive speed of stylus: 0.1 to 0.5 mm/s
(When the reference length is 1, 2, 3, or 4, the evaluation length correspondingly becomes 1, 2, 3, or 4)

Selection of the reference length and the evaluation length of Rz and Sm were determined for each of ranges of Rz and Sm by a method specified in JIS B 0601 1994. Classifications of standard values of the reference length and the evaluation length corresponding to a range of Rz in the case of determining Rz are shown in Table 1 and classifications of standard values of the reference length and the evaluation length corresponding to a range of Sm in the case of determining Sm are shown in Table 2. A value in a parenthesis is a reference value.

TABLE 1

| Range of Rz (µm) | | Reference length | Evaluation length |
|---|---|---|---|
| Exceeding | Max. | (mm) | (mm) |
| (0.025) | 0.10 | 0.08 | 0.4 |
| 0.10 | 0.50 | 0.25 | 1.25 |
| 0.50 | 10.0 | 0.8 | 4 |
| 10.0 | 50.0 | 2.5 | 12.5 |
| 50.0 | 200.0 | 8 | 40 |

TABLE 2

| Range of Sm (mm) | | Reference length (mm) | Evaluation length (mm) |
|---|---|---|---|
| Exceeding | Max. | | |
| 0.013 | 0.04 | 0.08 | 0.4 |
| 0.04 | 0.13 | 0.25 | 1.25 |
| 0.13 | 0.4 | 0.8 | 4 |
| 0.4 | 1.3 | 2.5 | 12.5 |
| 1.3 | 4.0 | 8 | 40 |

The optical layered body of the present invention achieves an antiglare property, excellent black color reproducibility, and contrast simultaneously. Specifically, by forming a surface adjustment layer considered as a formation method of this optical layered body on a conventional antiglare optical layered body (AG), which has an excellent antiglare property but has problems previously described, the surface roughness of the optical layered body surface becomes smooth, and further by providing surface roughness parameters equivalent to the AG, it becomes possible to prepare an antiglare layered body having extremely high gloss blackness while imparting the antiglare property.

Further, by a conventional antireflection method based on light interference, black color reproducibility (contrast) is high but prevention of the reflection of white substances is difficult. On the other hand, according to the optical layered body, having the above-mentioned surface roughness, of the present invention, it becomes possible to solve these problems.

The surface roughness of the optical layered body obtained by the production method of the present invention has specific optical properties (Sm, θa, and Rz). Accordingly, the above-mentioned effects are achieved well in the obtained optical layered body.

On the other hand, in the prior art, there is a method for representing a surface shape of the optical layered body by use of Ra (arithmetic mean roughness).

The above-mentioned Ra (arithmetic mean roughness) is according to JIS B 0601 (1994). That is, as shown in FIG. 3, Ra means the value obtained by that when sampling only the reference length from the roughness curve in the direction of mean line, taking X-axis in the direction of mean line and Y-axis in the direction of longitudinal magnification of this sampled part and the roughness curve is expressed by y=f(x), f(x) within a range of the reference length is summed and the summation is divided by the reference length.

That is, a function y=f(x) correspond an area of the roughness curve and areas of the roughness curve existing within a range of the reference length are summed and the summation of area is divided by the reference length to yield Ra.

Therefore, the Ra does not represent an average of a longitudinal height of the surface roughness. Further, even if actual surface roughness of two are different as shown in FIG. 4, the Ra of both curves are the same. Therefore, even if the surface roughness is specified by this Ra and Sm described above, in consideration of the difference in the shape shown in FIG. 4, this cannot represent a preferable surface roughness in the present invention, and therefore Ra is not selected as a parameter in the present invention.

The antiglare layer may be a single layer of a rough surface layer, or it may be composed of a under coat rough surface layer and a surface adjustment layer provided on the under coat rough surface layer. The under coat rough surface layer has a surface roughness at its outermost surface and can be obtained by the substantially same procedure as in the antiglare layer which is a single layer of the rough surface layer. Hereinafter, first, a production method of the present invention in the case where the antiglare layer is a single layer of the rough surface layer (hereinafter, referred to as a rough surface layer) will be described.

The method for producing an optical layered body of the present invention is a method for producing an optical layered body having a light-transmitting substrate and an antiglare layer formed on the light-transmitting substrate, including the step of forming the above-mentioned rough surface layer having a surface roughness on the above-mentioned light-transmitting substrate. In the production method of the present invention, with respect to the above-mentioned surface roughness of the surface of the resulting optical layered body, if denoting a mean spacing of profile irregularities of the surface of the optical layered body by Sm, a mean inclination angle of profile irregularities by θa, and a mean roughness of the surface roughness by Rz, Sm is 50 μm or more and less than 100 μm, θa is 0.1° or more and 1.0° or less, and Rz is more than 0.2 μm and 1.0 μm or less.

A layer thickness of the antiglare layer is preferably 5 μm or more and 25 μm or less in consideration of the dispersion of fine particles in an ink composition or an antiglare layer and the stability of production, and more preferably 6 μm or more and 20 μm or less. On the other hand, while in production, a relatively high level of layer thickness control is required, the layer thickness of the antiglare layer is preferably 1 μm or more and less than 5 μm, and more preferably 1.5 μm or more and 3.5 μm or less.

The layer thickness H of the antiglare layer refers to a portion from the interface on the display surface side of a substrate to the outermost surface of antiglare surface roughness adjacent to air. While an antiglare layer between the interface of the substrate and the outermost surface may be a single layer of the rough surface layer, may be a double layer composed of the under coat rough surface layer and the surface adjustment layer, or may be a multiple layer formed by forming any other layers, the layer thickness H in this case is a total thickness of all layers. That is, the layer thickness H means a thickness from the interface on the display surface side of a substrate to the outermost surface of antiglare surface roughness adjacent to air.

The layer thickness can be measured by the following method. Across section of the optical layered body is observed in a transmission mode with a confocal laser scanning microscope (Leica TCS-NT: manufactured by Ernst Leitz Optische Werke: a magnification of 300 to 1000 times) to determine the presence or absence of the interface according to the following evaluation criteria. Specifically, a wet objective lens was applied to the confocal laser scanning microscope and about 2 ml of oil with a refractive index of 1.518 was placed on the optical layered body to be observed in order to obtain clear images without halation. The oil is used to eliminate an air layer between the objective lens and the optical layered body.

Procedure of Measurement

1: An average layer thickness was measured through the observation of a laser scanning microscope.
2: Measuring conditions were described above.
3: A layer thickness of the maximum peak top from the substrate and a layer thickness of the minimum valley bottom from the substrate in the peak and valley shape per one image screen are measured, and this measurement was repeated for 5 image screens to yield 10 measured values to calculate an average from 10 measured values.

This laser scanning microscope can perform a nondestructive cross section observation by virtue of the difference in refractive indexes of the layers. Therefore, if the difference in refractive indexes is not clear or is close to 0, the thickness of the antiglare layer or the surface adjustment layer can be determined by observing SEM and TEM cross section photographs which can be observed through use of the differences in composition of the layers on 5 image screens.

In the present invention, the antiglare layer may be a single layer of the rough surface layer, but it may be a double layer. When the antiglare layer is a double layer, the antiglare layer is preferably composed of the under coat rough surface layer and the surface adjustment layer provided on the under coat rough surface layer. The under coat rough surface layer has a surface roughness at its outermost surface and can be obtained by the substantially same procedure as in the antiglare layer which is a single layer of the rough surface layer.

Hereinafter, a method for forming the rough surface layer in the present invention will be described.

The method for producing an optical layered body according to the present invention will be described by use of FIG. 5. FIG. 5 shows a sectional view of the optical layered body according to the present invention. The production method of the present invention is achieved by preparing a light-transmitting substrate 1, first, and then forming a rough surface layer 2 on the top face of the light-transmitting substrate 1. In the present invention, the method for forming a rough surface layer is not particularly limited and various methods can be used, but examples of a preferable method include the following methods 1, 2, and 3.

(Method 1) Method for Forming a Rough Surface Layer Having a Surface Roughness by Using a Composition for a Rough Surface Layer Containing a Resin and Fine Particles With respect to the fine particle used in a method for forming an antiglare layer having a surface roughness by using a composition for an antiglare layer containing a resin and fine particles, one kind of or several kinds of the fine particles to be used may be spheric (for example, true spheric), elliptic or nonspherical particles and true spheric particles are more preferable. An average particle diameter R of the fine particles is preferably 1.0 μm or more and 20 μm or less, and an upper limit of the particle diameter is more preferably 15 μm, and a lower limit is more preferably 1.3 μm and furthermore preferably 3.5 μm. In addition, the average particle diameter R of the fine particle can be measured by a Coulter counter method (electric resistance method). Further, the average particle diameter R can also be measured by a laser diffraction method or through SEM observation. Further, the fine particle may be an agglomerated type fine particle, and when the fine particle is an agglomerated type fine particle, it is preferred that a secondary particle diameter is within the above-mentioned range. In addition, when the fine particles are monodisperse particles (particles having single shape), the average particle diameter R (μm) represents an average particle diameter thereof, and when the fine particles are particles of a nonspherical type having a broad particle size distribution, a particle diameter of particles most existing in a particle size distribution measured is taken as an average particle diameter.

With respect to the fine particle, 80% or more (by weight; preferably 90% or more) of all fine particles preferably falls within an average particle diameter R±1.0 (preferably, 0.3) μm. Accordingly, the uniformity of the surface roughness of the antiglare layered body becomes good, and scintillation and the like can be prevented effectively. However, when the fine particle having an average particle diameter of less than 3.5 μm is used, fine particles out of the above particle size distribution, for example, nonspherical fine particles having a broad particle size distribution and an average particle diameter of 2.5 μm or 1.5 μm may be used.

Further, when many kinds of fine particles are used as the fine particle to be used, a mixture of two or three kinds of fine particles may be used which are different in particle diameter and material. When the mixture of two or three kinds of fine particles is used like this, a mixture of two or three kinds of fine particles, which are made of the same material and are different only in particle diameter and particle size distribution, may be formed, or a mixture of two or three kinds of fine particles made of different materials may be formed and used.

When a mixture of two or more kinds of fine particles is used, the fine particles preferably has a distribution profile having two or more distribution-peaks in a distribution of the whole particles. That is, by using particles with a large particle diameter having a property of principally forming a surface roughness in combination with particles with a small particle diameter, the particles with a large particle diameter can be uniformly distributed on the whole and a desired roughness can be attained.

That is, it is preferred that particles, in which the average particle diameter is 1.0 μm or more and 20 μm or less (preferably, a lower limit is 3.5 μm and an upper limit is 15.0 μm) and 80% or more (by weight; preferably 90% or more) of all fine particles falls within an average particle diameter R 1.0 (preferably, 0.3) μm, are taken as first fine particles, and a fine particle composition formed by adding second fine particles and third fine particle, respectively having smaller particle sizes, to the first fine particles and mixing these fine particles is used. In addition, when a plurality of fine particles are used by use of the second fine particles, a difference n in refractive indexes between the resin and the fine particle in the present invention is a value determined by subtracting a refractive index of the resin from a refractive index of the fine particle having the highest refractive index among the fine particles.

If the particle diameter of the first fine particles is denoted by R1 and the particle diameter of the second fine particles is denoted by R2, the particle diameter R2 preferably satisfies the following expression (I):

$$0.25 \times R1 \text{ (preferably 0.50)} \leq R2 \leq 1.0 \times R1 \text{ (preferably 0.75)} \quad (I).$$

Further, the composition may further contain a plurality of other fine particles. This relationship holds between the second fine particles and the third fine particles. If the particle diameter of the third fine particles is denoted by R3, the particle diameter R3 preferably satisfies the following expression (II):

$$0.25 \times R2 \text{ (preferably 0.50)} \leq R3 \leq 1.0 \times R2 \text{ (preferably 0.75)} \quad (II).$$

However, when the first, second and third fine particles are composed of the same component, it is preferable that the particle diameters differ inevitably. When a mixture of two or more kinds of fine particles made of different materials is used, it is preferable that these two or more kinds of fine particles have different average particle diameters as described above, two or more kinds of fine particles having the same average particle diameter are also preferably used.

When R2 is 0.25×R1 or higher and R3 is 0.25×R2 or higher, dispersion of the applying solution becomes easy and particles are not agglomerated. Further, in a drying step after application, a uniform surface roughness can be formed without being affected with wind at the time of floating.

Further, according to another aspect of the present invention, when the total weight per unit surface area of the first fine particles is denoted by $M_1$, the total weight per unit surface area of the second fine particles is denoted by $M_2$, and the total weight per unit surface area of the resin is denoted by M, total weight ratio per unit surface area of the resin, first fine particles and second fine particles preferably satisfies the following expressions (III) and (IV):

$$0.08 \leq (M_1+M_2)/M \leq 0.36 \quad \text{(III) and}$$

$$0 \leq M_2 \leq 4.0 M_1 \quad \text{(IV)}.$$

The above-mentioned second fine particles are not particularly limited and inorganic and organic materials similar to those of the first fine particles can be used. The content of the second fine particles is preferably 3 to 100% by weight with respect to the content of the first fine particles. The compounding content of the third fine particle may be similar to that of the second fine particles.

In the present invention, it is preferable to form a surface roughness using two kinds of fine particles or three kinds of fine particles.

In this case, each kind of fine particle principally has the following role, and a material and a particle diameter of the fine particle can be appropriately selected based on the role. However, this role is just an example and the role of the first fine particles, the role of the second fine particles, and the role of the third fine particle can be appropriately selected.

First, when two kinds of the fine particles are used as a fine particle, the fine particles having a larger particle diameter (that is, the first fine particles described above) principally has a function of forming a surface roughness. As fine particles to be used for such an objective, fine particle (that is, fine particle in which the difference in refractive indexes between the fine particle and the binder resin is small) not having an internal diffusion property described later is principally selected. When the rough surface layer is formed, a particle diameter of the first fine particles may be larger than a film thickness of a matrix resin. In this case, the first fine particles are in a state in which fine particles stuck their tops out of a coat of the rough surface layer and whereby, the surface roughness is formed.

In such the first fine particles, there may be cases where a preferable surface roughness cannot be obtained because of agglomeration in the antiglare layer particularly when the first fine particles are made of a material which is easy to agglomerate. In such a case, it is preferable to use fine particles (that is, the second fine particles described above) having a smaller particle diameter of 75% or less of the particle diameter of the first fine particles in combination in order to improve the dispersibility of the first fine particles in a lateral direction in the antiglare layer. Accordingly, the surface roughness can be controlled well and formed uniformly throughout the coat. The above-mentioned second fine particles may be fine particles having an internal diffusion property or may be nonspherical coherent fine particles.

The third fine particles having a smaller particle diameter may be used in combination in addition to the first fine particles and the second fine particles. In this case, fine particles (that is, fine particle in which the difference in refractive indexes between the fine particle and the binder resin is large) generating an internal diffusion property are preferably selected as the second fine particles. The particle diameter of the second fine particles is preferably as small as 75% or less of the particle diameter of the first fine particles. The third fine particle is more fine than the second fine particles and becomes a space for making the dispersibility of the first fine particles and the second fine particles in a lateral direction in the antiglare layer better to form a preferable surface roughness. Accordingly, the surface roughness can be controlled well and formed uniformly throughout the coat. The particle diameter of the above-mentioned third fine particles is preferably as small as 85% or less of the particle diameter of the second fine particles.

A material of the fine particle is not particularly limited, and organic materials or inorganic materials can be used and transparent materials are preferable. Specific examples of fine particles formed from the organic materials include plastic beads. Examples of the above-mentioned plastic beads include polystyrene beads (refractive index 1.59 to 1.60), melamine beads (refractive index 1.57), acrylic beads (refractive index 1.49 to 1.53), acrylic-styrene beads (refractive index 1.54 to 1.58), benzoguanamine-formaldehyde beads, polycarbonate beads, polyethylene beads, and the like. The above-mentioned plastic beads preferably have a hydrophobic group at its surface and examples of the beads having a hydrophobic group include styrene beads. Examples of the above-mentioned inorganic fine particles include nonspherical silica, and the like.

As the above-mentioned nonspherical silica, silica beads having good dispersibility and a particle diameter of 0.5 to 5 μm are preferably used. The content of the nonspherical silica is preferably 1 to 30 parts by weight with respect to the binder resin. In order to improve the dispersibility of the nonspherical silica without causing an increase in the viscosity of the composition for an antiglare layer described later in detail, the average particle diameter and addition amount are changed and at the same time, presence or absence of organic material treatment for the particle surfaces may also be changed to be used. In the case of carrying out the organic material treatment for the particle surfaces, a hydrophobic treatment is preferable.

As for the above-mentioned organic material treatment, there are a method for chemically bonding a compound to the bead surface and a physical method for impregnating voids existing in a composition composing the bead with a compound without chemically bonding a compound to the bead surface, and either method may be used. Generally, a chemical treatment method, in which an active group of the silica surface such as a hydroxyl group or a silanol group is utilized, is preferably used from the viewpoint of treatment efficiency. As compounds to be used for the treatment, silane materials, siloxane materials, or silazane materials, which are highly reactive with the above-mentioned active group, are used. Examples of the compounds include straight alkyl monosubstituted silicone materials such as methyltrichlorosilane, branched alkyl monosubstituted silicone materials, or polysubstituted straight alkyl silicone compounds such as di-n-butyldichlorosilane, ethyldimethylchlorosilane and the like, and polysubstituted branched alkyl silicone compounds. Similarly, straight alkyl or branched alkyl monosubstituted or polysubstituted siloxane materials or silazane materials can also be effectively used.

A substance having such as a heteroatom, an unsaturated bonding group, a cyclic bonding group, or an aromatic functional group at the end or intermediate site of the alkyl chain may be used in accordance with a required function. In these compound, it becomes possible to convert the material surface to be treated readily from hydrophilicity to hydrophobicity since the alkyl group contained in the compound exhibits hydrophobicity, and therefore the compounds can attain high affinity for a polymeric material for which the compounds have low affinity in a state of being untreated.

The rough surface layer in the present invention preferably forms the surface roughness of the surface not only to provide an antiglare property but also to provide an internal scattering property (the internal scattering property becomes high with increases in difference in refractive indexes) caused by the difference in refractive indexes between the matrix and the fine particle.

This internal scattering property can effect the ability to improve scintillation (phenomenon in which surface roughness of the surface act as a lens and this causes brightness to vary and the visibility to deteriorate particularly in the case of a high definition display having a small pixel size) which is a problem in the antiglare film.

As the fine particle providing such ability to improve scintillation, the fine particles, in which a difference in refractive indexes between the above-mentioned binder and the fine particle is 0.03 to 0.20, is preferably used. The reason why the difference in refractive indexes between the binder contained in the antiglare layer and the fine particle is preferably set at 0.03 or more and 0.20 or less is that if the difference in refractive indexes is less than 0.03, an effect of diffusing light may be not achieved because of too small difference in refractive indexes, and if the difference in refractive indexes is more than 0.20, the whole film may become cloudy because of a too high light diffusing property. In addition, the difference in refractive indexes between the fine particle and the binder is particularly preferably 0.04 or more and 0.16 or less, furthermore 0.09 or less.

In the above-mentioned fine particles, when two or more kinds of light-transmitting fine particles having different refractive indexes are used and these fine particle are mixed, an average value, according to a mixing ratio of each fine particle, of refractive indexes of the respective fine particles can be considered as a refractive index of the mixed light-transmitting fine particles, and therefore by adjusting a mixing ratio of the respective fine particles, detailed setting of the refractive index becomes possible, control of the refractive index becomes more easy than the case where one kind of fine particle is used, and various design becomes possible.

Therefore, in the present invention, two or more kinds of fine particles having different refractive indexes may be used as the above-mentioned fine particle. In this case, the difference in refractive indexes between the first fine particles and the second fine particle is preferably 0.03 or more and 0.10 or less. In the above-mentioned fine particle, the reason why the difference in refractive indexes between the first fine particles and the second fine particle is preferably 0.03 or more and 0.10 or less is that if the difference in refractive indexes is less than 0.03, since the difference in refractive indexes between both fine particles may be too small, a degree of freedom of refractive index control is small in mixing both fine particles, and if the difference in refractive indexes is more than 0.10, light diffusion may be determined by fine particles having a larger difference in refractive indexes between a matrix and the fine particle. In addition, the difference in refractive indexes is more preferably 0.04 or more and 0.09 or less, and particularly preferably 0.05 or more and 0.08 or less.

As the first fine particles which are included in the rough surface layer, particularly, fine particles having high transparency and a refractive index difference between the fine particle and a binder of the above-mentioned values are preferable. Specific examples of organic fine particles used for the first fine particle include an acrylic bead (refractive index 1.49 to 1.533), a styrene-acrylic copolymer bead (refractive index 1.55), a melamine bead (refractive index 1.57), a polycarbonate bead (refractive index 1.57), and the like. Examples of inorganic fine particles include a nonspherical silica bead (refractive index 1.45 to 1.50).

As the second fine particles, organic fine particles are preferable, and it is preferable to combine, particularly, organic fine particles having high transparency and a refractive index difference between the fine particle and a resin of the above-mentioned values to use.

Specific examples of organic fine particles used for the second fine particle include such as a styrene bead (refractive index 1.59 to 1.60), a polyvinyl chloride bead (refractive index 1.60), and a benzoguanamine-formaldehyde condensate bead (refractive index 1.66).

Further, when two kinds of fine particles having different refractive indexes are used as the above-mentioned fine particle, it is preferable to set a particle diameter of the fine particle so as to satisfy the relationship of particle diameter of the first fine particles>particle diameter of the second fine particles as described above, but by daring to equalize the particle diameter of the first fine particles with that of the second fine particles, a ratio of the first fine particles to the second fine particles can be freely selected and used, whereby design of light diffusion becomes easy. Organic fine particles in which a monodisperse particle is easily obtainable is preferable in this point for equalizing the article diameter of the first fine particles with that of the second fine particles. Reduction in variations in the particle diameter is preferable because variations in the antiglare property and the internal scattering characteristics decrease and optical performance design of the antiglare layer becomes easy. Examples of means for enhancing monodispersibility include air classification and wet filter classification by filtration filter.

The rough surface layer can be formed by using a composition for a rough surface layer containing the above-mentioned fine particles and a curable resin. As the above-mentioned curable resin, a transparent resin is preferable, and examples of the curable resin include ionizing radiation-curable resins which are resins to be cured with ultraviolet light or electron beams, and a mixture of the ionizing radiation-curable resin and a solvent-drying resin (a resin, such as a thermoplastic resin, which forms a coat by only evaporating a solvent previously added in order to adjust a solid content in applying the resin), or a thermosetting resin. More preferably, the curable resin is the ionizing radiation-curable resin. In addition, in the present specification, the term "resin" is a concept which also comprehends resin components such as a monomer and an oligomer.

Examples of the above ionizing radiation-curable resins include compounds having one or more unsaturated bonds such as compounds having acrylic functional groups and the like. Examples of the compounds having one unsaturated bond include ethyl (meth)acrylate, ethylhexyl (meth)acrylate, styrene, methylstyrene, N-vinylpyrrolidone, and the like. Examples of the compounds having two or more unsaturated bonds include polyfunctional compounds such as polymethylolpropane tri(meth)acrylate, hexanediol (meth)acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth)acrylate and neopentyl glycol di(meth)acrylate; and reaction products (for example, a poly(meth)acrylate ester of polyhydric alcohol) of the polyfunctional compound with (meth)acrylate, and the like. In addition, in the present specification, "(meth)acrylate" refers to methacrylate and acrylate.

Besides the above-mentioned compound, a polyester resin, a polyether resin, an acrylic resin, an epoxy resin, a urethane resin, an alkyd resin, a spiroacetal resin, a polybutadiene resin, and a polythiol-polyen resin, which have an unsaturated double bond and a relatively low molecular weight, can also be used as the above ionizing radiation-curable resin.

When the ionizing radiation-curable resin is used as an ultraviolet-curable resin, it is preferable to use a photopolymerization initiator. Specific examples of the photopolymerization initiator include acetophenones, benzophenones, Michler's benzoyl benzoate, α-amyloxim ester, thioxanthones, propiophenones, benzyls, benzoins, and acylphosphine oxides. Further, it is preferable to mix a photosensitizer to use, and specific example of the photosensitizer include n-butylamine, triethylamine, poly-n-butylphosphine, and the like.

As the photopolymerization initiator, in the case of resins having a radically polymerizable unsaturated group, acetophenones, benzophenones, thioxanthones, benzoin, or benzoin methyl ether is preferably used singly, or used as a mixture thereof. Further, as the photopolymerization initiator, in the case of resins having a cationically polymerizable functional group, aromatic diazonium salt, aromatic sulfonium salt, aromatic iodonium salt, a metallocene compound, or benzoin sulfonate is preferably used singly, or used as a mixture thereof. The addition amount of the photopolymerization initiator is preferably 0.1 to 10 parts by weight with respect to 100 parts by weight of the ionizing radiation-curable composition.

The ionizing radiation-curable resin can also be used in combination with the solvent-drying resin. The solvent-drying resin, which can be used in combination with the ionizing radiation-curable resin, is not particularly limited, and a thermoplastic resin can be generally used as the solvent-drying resin. By using the ionizing radiation-curable resin in combination with the solvent-drying resin, coat defects of a coated surface can be effectively prevented and whereby a more excellent gloss blackness can be attained. The thermoplastic resin is not particularly limited, and examples of the thermoplastic resin include styrene resins, (meth)acrylic resins, vinyl acetate resins, vinyl ether resins, halogen-containing resins, alicyclic olefin resins, polycarbonate resins, polyester resins, polyamide resins, cellulose derivatives, and silicone resins, and rubbers or elastomers. Preferably, the thermoplastic resin is non-crystalline and soluble inorganic solvents (particularly, common solvent in which a plurality of polymers or curable compounds can be dissolved). Particularly from the viewpoint of a film forming property, transparency and weather resistance, styrene resins, (meth)acrylic resins, alicyclic olefin resins, polyester resins, cellulose derivatives (cellulose esters, etc.) and the like are preferable.

When a material of the light-transmitting substrate is a cellulose resin such as triacetyl cellulose (TAC), as the thermoplastic resins, cellulose resins, for example, nitrocellulose, acetyl cellulose, cellulose acetate propionate, ethyl hydroxyethyl cellulose and the like, are preferable.

Examples of the thermosetting resin include a phenolic resin, a urea resin, a diallylphthalate resin, a melanin resin, a guanamine resin, an unsaturated polyester resin, a polyurethane resin, an epoxy resin, an aminoalkyd resin, a melamine-urea copolycondensation resin, a silicon resin, a polysiloxane resin and the like. When the thermosetting resin is used, it can also be used in combination with a curing agent such as a crosslinking agent or a polymerization initiator, a polymerization accelerator, a solvent, a viscosity adjustment agent or the like as required.

The above-mentioned rough surface layer can be formed by applying a composition for a rough surface layer obtained by mixing fine particles and a resin in a proper solvent onto the light-transmitting substrate. Examples of the proper solvent include alcohols such as methanol, ethanol, isopropyl alcohol, butanol, isobutyl alcohol, methyl glycol, methyl glycol acetate, methyl cellosolve, ethyl cellosolve and butyl cellosolve; ketones such as acetone, methyl ethyl ketone, methyl isobutyl ketone, cyclohexanone and diacetone alcohol; esters such as methyl formate, methyl acetate, ethyl acetate, ethyl lactate and butyl acetate; nitrogen-containing compounds such as nitromethane, N-methylpyrrolidone and N,N-dimethylformamide; ethers such as diisopropyl ether, tetrahydrofuran, dioxane and dioxolane; halogenated hydrocarbons such as methylene chloride, chloroform, trichloroethane and tetrachloroethane; others such as dimethyl sulfoxide, propylene carbonate and propylene glycol monomethyl ether (PGME); or mixtures thereof. Examples of a more preferable solvent include such as methyl acetate, ethyl acetate, butyl acetate, methyl ethyl ketone, methyl isobutyl ketone, cyclohexanone and toluene.

In accordance with preferable aspects of the present invention, the rough surface layer may be a layer having a function of imparting an antistatic property, adjustment of a refractive index, increase in hardness, an antifouling property and the like. In this case, the rough surface layer can be formed from the composition for a rough surface layer containing other additives as required.

The composition for a rough surface layer may contain an antistatic agent.

The antistatic agent is not particularly limited, and examples of the antistatic agent include cationic compounds having such as quaternary ammonium salt, pyridinium salt, a primary, a secondary, and a tertiary amino group; anionic compounds having such as a sulfonate group, a sulfate group, a phosphate group and a phosphonate group; ampholytic compounds such as amino acid and aminosulfate; nonionic compounds such as amino alcohol, glycerin and polyethylene glycol; organic metal compounds such as alkoxide tin or titanium; and metal chelate compounds such as acetylacetonate salt of the organic metal compound. As the antistatic agent, compounds formed by polymerizing the compounds described above can also be used. Further, polymerizable compounds such as monomer or oligomer which has a tertiary amino group, a quaternary ammonium group or a metal chelate portion and is polymerizable with ionizing radiation, and organic metal compounds like a coupling agent having a functional group can also be used as an antistatic agent.

Examples of the antistatic agent also include conductive polymers. By using the conductive polymer, it becomes possible that excellent antistatic performance is exerted and simultaneously a total light transmittance of the optical layered body is enhanced and a haze value is reduced. Further, an anion of organic sulfonic acid, iron chloride or the like may also be added as a dopant (electron-donating agent) for the purpose of improving electric conductivity or antistatic performance.

Examples of the above-mentioned conductive polymers include aliphatic conjugated polyacetylene, polyacene and polyazulene, aromatic conjugated polyphenylene, heterocyclic conjugated polypyrrole, polythiophene and polyisothianaphthene, heteroatom-containing conjugated polyaniline and polythienylenevinylene, mixed type conjugated poly(phenylenevinylene), a double chain conjugated system which is a conjugated system having a plurality of conjugate chains in a molecule, derivatives of these conductive polymers, and a conductive complex which is a polymer prepared by grafting or block-copolymerizing these conjugated polymer chain to a saturated polymer.

Among others, it is preferable to use polythiophene, polyaniline and polypyrrole.

Furthermore, polythiophene is particularly preferable since it has high transparency and a high antistatic property and an excellent effect of addition of dopant. As the above polythiophene, oligothiophene can also be suitably used.

Further, the above-mentioned derivatives are not particularly limited, and examples of the derivatives include such as alkyl group substitutes of polyphenylacetylene and polydiacetylene.

The antistatic agent may be a conductive fine particle such as a conductive metal oxide fine particle. The conductive metal oxide fine particle is not particularly limited, and examples of the conductive metal oxide fine particle include ZnO (refractive index 1.90, hereinafter, values in a parenthesis all represent a refractive index), $Sb_2O_2$ (1.71), $SnO_2$ (1.997), $CeO_2$ (1.95), indium tin oxide (abbreviation; ITO, 1.95), $In_2O_3$ (2.00), $Al_2O_3$ (1.63), antimony-doped tin oxide (abbreviation; ATO, 2.0), and aluminum-doped zinc oxide (abbreviation; AZO, 2.0). A fine particle refers to a particle having an average particle diameter of 1 micron or smaller, that is sub micron, and it is preferably a particle having an average particle diameter of 0.1 nm to 0.1 µm in that a composition capable of forming a highly transparent film, in which haze is little found and a total light transmittance is good, in dispersing the ultrafine particles in the binder can be prepared. The average particle diameter of the conductive metal oxide fine particle can be measured by a dynamic light-scattering method.

The addition amount of the antistatic agent is preferably 5 to 250% by weight with respect to the amount of the binder resin (excluding a solvent), and more preferably, an upper limit of the addition amount is 100% by weight and a lower limit is 7% by weight. The addition amount within the above-mentioned range is preferable in that by adjusting the addition amount within the above range, transparency as an optical layered body is maintained and antistatic performance can be provided without adversely affecting properties such as gloss blackness and an antiglare property.

The composition for a rough surface layer may contain an antifouling agent. The above-mentioned antifouling agent is primarily intended to prevent the fouling on the outermost surface of the optical layered body and it further enables to impart scratching resistance to the optical layered body. As the antifouling agent, additives to exert water repellency, oil repellency or a fingerprint removing property are effective, and examples of such antifouling agents include fluorine compounds, silicon compounds, and mixed compounds thereof. Examples of the above-mentioned silicon compounds include silane coupling agents having a fluoroalkyl group such as (2-(perfluorooctyl)ethyl)triaminosilane or the like, and particularly, a silane coupling agent having an amino group is preferable.

The composition for a rough surface layer may contain a refractive index adjusting agent. It becomes possible to adjust the optical characteristics of the optical layered body by using the above-mentioned refractive index adjusting agent. Examples of the refractive index adjusting agent include a low refractive index agent, a medium refractive index agent, and a high refractive index agent.

The above-mentioned low refractive index agent has a lower refractive index than that of the rough surface layer. In accordance with a preferable aspect of the present invention, it is preferable to have a constitution in which the refractive index of the rough surface layer is 1.5 or more and the refractive index of the low refractive index agent is less than 1.5 and preferably 1.45 or less.

The high refractive index agent and the medium refractive index agent may be added to the rough surface layer in order to improve an antireflection property further. The refractive indexes of the high refractive index agent and the medium refractive index agent may be set at 1.46 to 2.00, and the medium refractive index agent refers to an agent having a refractive index of 1.46 to 1.80, and the high refractive index agent refers to an agent having a refractive index of 1.65 to 2.00.

Examples of these refractive index agents include fine particles and specific examples (value in a parenthesis indicates a refractive index) of the fine particles include such as zinc oxide (1.90), titania (2.3 to 2.7), ceria (1.95), antimony-doped tin oxide (1.80), tin-doped indium oxide (1.95), zirconia (2.0), and yttria (1.87).

It is preferable to further add a fluorine or silicone leveling agent to the composition for a rough surface layer. The above-mentioned composition for a rough surface layer containing the leveling agent can improve the coating applicability and impart an effect of scratching resistance. The leveling agent is preferably utilized for a film-like light transmitting substrate (e.g. triacetyl cellulose and polyethylene terephthalate) required to have heat resistance.

Examples of a method for applying the composition for a rough surface layer onto the light-transmitting substrate include application methods such as a roller coating method, a Mayer bar (metering coating rod) coating method and a gravure coating method. The composition for a rough surface layer is dried and subjected to curing by ultraviolet light as required after applying the composition for a rough surface layer. Specific examples of an ultraviolet light source include light sources of an ultra high-pressure mercury lamp, a high-pressure mercury lamp, a low-pressure mercury lamp, a carbon arc lamp, a black light fluorescent lamp and a metal halide lamp. As a wavelength of the ultraviolet light, a wavelength band of 190 to 380 nm can be used. Specific examples of an electron beam source include various electron beam accelerators of a Cockcroft-Walton type, a van de Graaff type, a resonance transformer type, an insulating core transformer type, or a linear type, a Dynamitron type and a high-frequency type. The resin is cured and fine particles in the resin are fixed to form a desired surface roughness at the surface of the rough surface layer.

In addition, when the surface roughness are formed by such method 1, Sm, θa and Rz can be appropriately adjusted within desired ranges by adjusting the type of the resin to be used for forming the rough surface layer, the particle diameter and addition amount of particles to be used for forming the surface roughness, the composition and the film thickness of the surface adjustment layer, and the like.

Such formation of the rough surface layer by the method 1 is a method which can be particularly suitably applied in the third production method described above. Further, an antiglare film having a surface roughness is produced by the above-mentioned method and this film may be applied in the first production method described above. Furthermore, the composition for a rough surface layer described above may also be applied in the second and fourth production methods.
(Method 2) Method for Forming a Rough Surface Layer Having Surface Roughness by Using Composition for a Rough Surface Layer Containing Only a Resin Without Adding Fine Particles The above-mentioned method 2 is a method for forming a rough surface layer by providing the composition for a rough surface layer, which is obtained by combining at least two kinds of components selected from the group consisting of polymers and curable resin precursors, and mixing them with a proper solvent, on the light-transmitting substrate.

The surface roughness according to the method 2 can be formed, for example, by using the composition for a rough surface layer (hereinafter, this composition is referred to as a "composition for a phase separation type antiglare layer") containing at least two kinds of components selected from the group consisting of polymers and curable resin precursors. In such a method, by using the composition for a phase separation type antiglare layer which is formed by mixing at least two kinds of components selected from the group consisting of polymers and curable resin precursors with a proper solvent, a coat having a phase separated structure can be formed through spinodal decomposition from a liquid phase.

The above-mentioned composition for a phase separation type antiglare layer can form a phase separation structure with relatively regular inter-phase intervals by causing phase separation by spinodal decomposition between at least two kinds of components selected from the group consisting of polymers and curable resin precursors during the step for evaporating or removing the solvent by drying or the like after application on the light-transmitting substrate.

The above-mentioned spinodal decomposition forms a co-continuous phase structure along with the proceeding of the phase separation generated by removing a solvent and when the phase separation further proceeds, the continuous phase becomes discontinuous due to self surface tension to have a droplet phase structure (e.g. a sea-island structure of spherical, true spherical, disk-like, or elliptical independent phases). Accordingly, based on the extent of the phase separation, an intermediate structure between the co-continuous phase structure and droplet phase structure (the phase structure during the process of transferring from the above-mentioned co-continuous phase structure to the droplet phase structure) can also be formed. In the above-mentioned method 2, owing to such spinodal decomposition, the sea-island structure (droplet phase structure or phase structure in which one phase is independent or isolated), the co-continuous phase structure (or network structure), or the intermediate structure in which the co-continuous phase structure and the droplet phase structure are mixed form the fine roughness on the surface of the rough surface layer after drying out of the solvent.

Such spinodal decomposition accompanied with evaporation of the solvent is preferable in that since the average intervals among domains of the phase separation structure have regularity or periodicity, the surface roughness formed finally is provided with regularity or periodicity. The phase separation structure formed by the spinodal decomposition can be fixed by curing the curable functional groups or curable resin precursors in the polymer. The curable functional groups or curable resin precursors can be cured by heating, light irradiation or combinations of these methods in accordance with the type of the curable resin precursors. A heating temperature is not particularly limited as long as it is a condition of maintaining the phase separation structure formed by the above-mentioned spinodal decomposition and it is preferably, for example, 50 to 150° C. The curing by light irradiation can be carried out by the above-mentioned method such as ultraviolet curing. In the composition for phase separation type antiglare layer having a photo-curable property, a photopolymerization initiator is preferably contained. The components having a curable property may be polymers having curable functional groups or curable resin precursors.

At least two kinds of components selected from the group consisting of polymers and curable resin precursors are preferably used by selecting the combinations causing phase separation by the spinodal decomposition in a liquid phase. The combination for causing phase separation include, for example, (a) combinations for causing phase separation because a plurality of polymers are non-compatible with one another; (b) combinations for causing phase separation because polymers are non-compatible with curable resin precursors; and (c) combinations for causing phase separation because a plurality of curable resin precursors are non-compatible with one another. Among these combinations, (a) combinations of a plurality of polymers and (b) combinations of polymers and curable resin precursors are preferable and particularly (a) combinations of a plurality of polymers are preferable.

In the phase separation structure, the surface roughness is formed on the surface of the rough surface layer, and from the viewpoint of increase of surface hardness, the droplet phase structure having at least island-like domains is advantageous. In addition, in the case where a phase separation structure composed of the polymer and the curable resin precursor has the sea-island structure, the polymer component may form the sea-phase; however the polymer component preferably forms the island-like domains from the viewpoint of the surface hardness. Owing to formation of the island-like domains, the surface roughness exhibiting desired optical properties is formed at the surface of the rough surface layer after drying.

The average intervals of the domains of the above-mentioned phase separation structure practically have, in general, regularity or periodicity and correspond to the surface roughness Sm. The average interphase intervals of the domains may be, for example, 50 to 100 µm. The average intervals among domains of the phase separation structure can be adjusted by selecting the combinations of resins (particularly selection of resins based on the solubility parameter). By adjusting the average intervals among domains in such a manner, the intervals of the peaks and valleys at the surface of the film to be obtained finally becomes a desired value.

Examples of the polymer include cellulose derivatives (e.g. cellulose esters, cellulose carbamates, cellulose ethers), styrene resins, (meth)acrylic resins, organic acid vinyl ester resins, vinyl ether resins, halogen-containing resins, olefin resins (including alicyclic olefin resins), polyester resins, polyamide resins, polycarbonate resins, thermoplastic polyurethane resins, polysulfone resins (for example, polyethersulfone and polysulfone), polyphenylene ether resins (for example, polymer of 2,6-xylenol), silicone resins (for example, polydimethylsiloxane, polymethylphenylsiloxane), and rubbers or elastomers (for example, diene rubbers such as polybutadiene and polyisoprene, a styrene-butadiene copolymer, an acrylonitrile-butadiene copolymer, an acrylic rubber, a urethane rubber, a silicone rubber). These polymers may be used singly or in combination of two or more kinds. At least one polymer of a plurality of polymers may have a functional group involved in a curing reaction of the curable resin precursor, for example, a polymerizable group such as (meth)acryloyl group. A component of the polymer may be thermosetting or may be thermoplastic, but is more preferably a thermoplastic resin.

The polymer is preferably non-crystalline and soluble in organic solvents (particularly, a common solvent in which a plurality of polymers or curing compounds can be dissolved). Particularly, resins having a high molding property or film forming property, high transparency and high weather resistance, for example, styrene resins, (meth)acrylic resins, alicyclic olefin resins, polyester resins, and cellulose derivatives (cellulose esters, etc.) are preferable.

Specific examples of the cellulose esters among the cellulose derivatives include aliphatic organic acid esters, for example, cellulose acetates such as cellulose diacetate, and cellulose triacetate; $C_{1-6}$ organic acid esters such as cellulose propionate, cellulose butylate, cellulose acetate propionate and cellulose acetate butylate; aromatic organic acid esters, for example, $C_{7-12}$ aromatic carboxylic acid esters such as cellulose phthalate and cellulose benzoate; inorganic acid esters such as cellulose phosphate and cellulose nitrate;

mixed acid esters such as cellulose acetate-nitrate mixed ester; cellulose carbamates such as cellulose phenylcarbamate; cellulose ethers such as cyanoethyl cellulose; hydroxy-$C_{2-4}$ alkyl cellulose such as hydroxyethyl cellulose and hydroxypropyl cellulose; $C_{1-6}$ alkyl cellulose such as methyl cellulose and ethyl cellulose; carboxymethyl cellulose or salt thereof, benzyl cellulose and acetylalkyl cellulose.

Examples of the styrene resin include homopolymers or copolymers (for example, polystyrene, a styrene-α-methylstyrene copolymer, a styrene-vinyl toluene copolymer) of styrene monomers, and copolymers of a styrene monomer and other polymerizable monomers [for example, (meth)acrylic monomers, a maleic anhydride, maleimide monomers, dienes]. Examples of the styrene copolymers include a styrene-acrylonitrile copolymer (AS resin), copolymers of styrene and (meth)acrylic monomers [for example, a styrene-methyl methacrylate copolymer, a styrene-methyl methacrylate-(meth)acrylate copolymer, a styrene-methyl methacrylate-(meth)acrylic acid copolymer, etc.], and a styrene-maleic anhydride copolymer. Examples of preferable styrene resins include polystyrene, copolymers [for example, copolymers having styrene and methyl methacrylate as the main component such as styrene-methyl methacrylate copolymer] of styrene and (meth)acrylic monomers, an AS resin, and a styrene-butadiene copolymer.

As the (meth)acrylic resin, homopolymers or copolymers of (meth)acrylic monomers and copolymers of a (meth)acrylic monomer and a copolymerizable monomer can be used. As specific examples of the (meth) acrylic monomer, (meth) acrylic acid; $C_{1-10}$ alkyl (meth)acrylate such as methyl (meth)acrylate, ethyl (meth)acrylate, butyl (meth)acrylate, t-butyl (meth)acrylate, isobutyl (meth)acrylate, hexyl (meth)acrylate, octyl (meth)acrylate, 2-ethylhexyl (meth)acrylate and the like; aryl (meth)acrylates such as phenyl (meth)acrylate and the like; hydroxyalkyl (meth)acrylate such as hydroxyethyl (meth)acrylate, hydroxypropyl (meth)acrylate and the like; glycidyl (meth)acrylate; (N,N-dialkylamino) alkyl (meth)acrylate; (meth) acrylonitrile; and (meth)acrylate having an alicyclic hydrocarbon group such as tricyclodecane or the like can be exemplified. As specific examples of the copolymerizable monomer, the above styrene monomers, vinyl ester monomers, maleic anhydride, maleic acid, fumaric acid and the like can be exemplified, and these monomers can be used alone or in combination of two or more kinds.

Examples of the (meth)acrylic resins include poly(meth)acrylates such as poly(methyl methacrylate), methyl methacrylate-(meth)acrylic acid copolymers, methyl methacrylate-(meth)acrylate copolymers, methyl methacrylate-acrylate-(meth)acrylic acid copolymers, and (meth)acrylate-styrene copolymers (MS resins). Specific examples of preferable (meth)acrylic resins include poly($C_{1-6}$ alkyl (meth)acrylate) such as poly(methyl (meth)acrylate), particularly, methyl methacrylate resins having methyl methacrylate as the main component (the content of the main component is 50 to 100% by weight, preferably about 70 to 100% by weight).

Specific examples of the organic acid vinyl ester resins include homopolymers or copolymers (polyvinyl acetate, polyvinyl propionate, etc.) of vinyl ester monomers, and copolymers (ethylene-vinyl acetate copolymer, vinyl acetate-vinyl chloride copolymer, vinyl acetate-(meth)acrylate copolymer, etc.) of a vinyl ester monomer and copolymerizable monomers, or derivatives thereof. Specific examples of the derivatives of the vinyl ester resins include polyvinyl alcohol, an ethylene-vinyl alcohol copolymer, a polyvinyl acetal resin, and the like.

Specific examples of the vinyl ether resins include homopolymers or copolymers of vinyl $C_{1-10}$ alkyl ethers such as vinyl methyl ether, vinyl ethyl ether, vinyl propyl ether, vinyl t-butyl ether and the like; and copolymers (vinyl alkyl ether-maleic anhydride copolymers, etc.) of vinyl $C_{1-10}$ alkyl ether and copolymerizable monomers.

Specific examples of the halogen-containing resins include polyvinyl chloride, polyvinylidene fluoride, vinyl chloride-vinyl acetate copolymer, vinyl chloride-(meth)acrylate copolymer, vinylidene chloride-(meth)acrylate copolymer, and the like.

Examples of the olefin resins include homopolymers of olefins such as polyethylene, polypropylene and the like, and copolymers such as ethylene-vinyl acetate copolymer, ethylene-vinyl alcohol copolymer, ethylene-(meth)acrylic acid copolymer and ethylene-(meth)acrylate copolymer. As specific examples of the alicyclic olefin resins, homopolymers or copolymers (for example, polymers having an alicyclic hydrocarbon group such as tricyclodecane which is sterically rigid) of cyclic olefins (for example, norbornene, dicyclopentadiene), and copolymers (for example, ethylene-norbornene copolymer, propylene-norbornene copolymer) of the above cyclic olefins and copolymerizable monomers can be exemplified. As specific examples of the alicyclic olefin resins, trade name "ARTON", and trade name "ZEONEX" are available.

Examples of the above-mentioned polyester resins include aromatic polyesters using aromatic dicarboxylic acid such as terephthalic acid, homopolyesters such as poly($C_{2-4}$ alkylene terephthalate), for example, polyethylene terephthalate and polybutylene terephthalate, and poly($C_{2-4}$ alkylene naphthalate), copolyesters containing $C_{2-4}$ alkylene arylate units ($C_{2-4}$ alkylene terephthalate and/or $C_{2-4}$ alkylene naphthalate) as a main component (e.g. 50% by weight or more) and the like. Specific examples of copolyesters include copolyesters obtained by partially replacing $C_{2-4}$ alkylene glycols among constituent units of the poly($C_{2-4}$ alkylene arylate) with polyoxy $C_{2-4}$ alkylene glycol, $C_{6-10}$ alkylene glycol, alicyclic diol (cyclohexanedimethanol, hydrogenated bisphenol A, etc.), diols having aromatic rings (9,9-bis(4-(2-hydroxyethoxy)phenyl)fluorene having fluorenone side chains, bisphenol A, or bisphenol A-alkylene oxide adduct, etc.), and copolyesters obtained by partially replacing aromatic dicarboxylic acid with asymmetric aromatic dicarboxylic acid such as phthalic acid and isophthalic acid or aliphatic $C_{6-12}$ dicarboxylic acid such as adipic acid. Specific examples of the polyester resins include polyarylate resins, aliphatic polyesters using aliphatic dicarboxylic acids such as adipic acid, and also homopolymers or copolymers of lactones such as ∈-caprolactone. Preferable polyester resins are, in general, amorphous like amorphous copolyesters (e.g. $C_{2-4}$ alkylene arylate copolyesters) and the like.

Examples of the polyamide resin include aliphatic polyamides such as nylon 46, nylon 6, nylon 66, nylon 610, nylon 612, nylon 11, and nylon 12, and polyamides obtained from dicarboxylic acids (e.g. terephthalic acid, isophthalic acid, adipic acid, etc.) and diamines (e.g. hexamethylenediamine, meta-xylylenediamine), and the like. Specific examples of the polyamide resins may be homocopolymers or copolymers of lactams such as ∈-caprolactam, or may be not only homopolyamide copolyamides but also homopolyamides.

Examples of the polycarbonate resins include aromatic polycarbonates based on bisphenols (bisphenol A, etc.), and aliphatic polycarbonates such as diethylene glycol bis(allyl carbonate).

As the polymer, a polymer having a curable functional group can also be used. The curable functional group may exist in a polymer main chain or may exist in a side chain, but it more preferably exists in a side chain. Examples of the curable functional group include condensing groups or reactive groups (for example, a hydroxyl group, an acid anhydride group, a carboxyl group, an amino group or an imino group, an epoxy group, a glycidyl group, an isocyanate group), polymerizable groups (for example, $C_{2-6}$ alkenyl groups such as a vinyl group, a propenyl group, an isopropenyl group, a butenyl group and an allyl group, $C_{2-6}$ alkynyl groups such as an ethynyl group, a propynyl group and a butynyl group, and $C_{2-6}$ alkenyliden groups such as vinylidene), and groups (for example, (meth)acryloyl group) having these polymerizable groups. Of these functional groups, polymerizable groups are preferable.

Examples of a method for introducing the curable functional group in a side chain include a method for reacting a thermoplastic resin having a functional group such as a reactive group or a condensing group with a polymerizable compound having a group which is reactive with the above functional group.

As the thermoplastic resin having a functional group such as a reactive group or a condensing group, thermoplastic resins (for example, (meth)acrylic resins, polyester resins, polyamide resins) having a carboxyl group or a group of an acid anhydride thereof, thermoplastic resins (for example, (meth)acrylic resins, polyurethane resins, cellulose derivatives, and polyamide resins, which have a hydroxyl group, respectively) having a hydroxyl group, thermoplastic resins (for example, polyamide resins) having an amino group, and thermoplastic resins (for example, (meth)acrylic resins and polyester resins, having an epoxy group) having an epoxy group can be exemplified. Further, resins obtained by introducing the functional group into a thermoplastic resin such as styrene resins, olefinic resins or alicyclic olefinic resins by copolymerization or graft polymerization may be used.

When the polymerizable compound is reacted with the thermoplastic resin having a carboxyl group or a group of an acid anhydride thereof, a polymerizable compound having an epoxy group, a hydroxyl group, an amino group, an isocyanate group or the like can be used. When the polymerizable compound is reacted with the thermoplastic resin having a hydroxyl group, examples of the polymerizable compound include polymerizable compounds having a carboxyl group or a group of an acid anhydride thereof, or an isocyanate group. When the polymerizable compound is reacted with the thermoplastic resin having an amino group, examples of the polymerizable compound include polymerizable compounds having a carboxyl group or a group of an acid anhydride thereof, an epoxy group, or an isocyanate group. When the polymerizable compound is reacted with the thermoplastic resin having an epoxy group, examples of the polymerizable compound include polymerizable compounds having a carboxyl group or a group of an acid anhydride thereof, or an amino group.

Of the polymerizable compounds, as the polymerizable compound having an epoxy group, for example, epoxycyclo-$C_{5-8}$ alkenyl (meth)acrylate such as epoxycyclohexenyl (meth)acrylate, glycidyl (meth)acrylate, allyl glycidyl ether and the like can be exemplified. As the polymerizable compound having a hydroxyl group, for example, hydroxy-$C_{1-4}$ alkyl (meth)acrylate such as hydroxypropyl (meth)acrylate and $C_{2-6}$ alkylene glycol (meth)acrylate such as ethylene glycol mono(meth)acrylate can be exemplified. As the polymerizable compound having an amino group, for example, amino-$C_{1-4}$ alkyl (meth)acrylate such as aminoethyl (meth)acrylate, $C_{3-6}$ alkenyl amine such as allylamine, and aminostyrenes such as 4-aminostyrene, and diaminostyrenes can be exemplified. As the polymerizable compound having an isocyanate group, for example, (poly)urethane (meth)acrylate and vinyl isocyanate can be exemplified. As the polymerizable compound having a carboxyl group or a group of an acid anhydride thereof, for example, unsaturated carboxylic acid or an anhydride thereof such as (meth)acrylic acid or maleic anhydride can be exemplified.

Typical examples of the polymerizable compounds include a combination of a thermoplastic resin having a carboxyl group or a group of an acid anhydride thereof and an epoxy group-containing compound, especially a combination of a (meth)acrylic resin ((meth)acrylic acid-(meth)acrylate copolymer, etc.) and epoxy group-containing (meth)acrylate (epoxycycloalkenyl (meth)acrylate, glycidyl (meth)acrylate, etc.). Specifically, a polymer obtained by introducing a polymerizable unsaturated group in a part of a carboxyl group of a (meth)acrylic resin, for example, a (meth)acrylic polymer (CYCLOMER P, manufactured by Daicel Chemical Industries, Ltd.) obtained by introducing a photopolymerizable unsaturated group in a side chain by the reaction of an epoxy group of 3,4-epoxycyclohexenyl methyl acrylate with a part of a carboxyl group of a (meth)acrylic acid-(meth)acrylate copolymer, can be used.

The introduction amount of the functional groups (particularly polymerizable groups) relevant to a curing reaction into the thermoplastic resins is preferably 0.001 to 10 mol, more preferably 0.01 to 5 mol, and furthermore preferably about 0.02 to 3 mol with respect to 1 kg of the thermoplastic resins.

The above-mentioned curable resin precursors are compounds having functional groups reacted by heat, an active energy beam (ultraviolet light and electron beams), and the like, and compounds capable of forming resins (particularly, curable resins or crosslinkable resins) by curing or crosslinking by heat, an active energy beam and the like. Examples of the above-mentioned resin precursors include, for example, thermosetting compounds or resins [low molecular weight compounds (e.g. epoxy resins, unsaturated polyester resins, urethane resins, silicone resins) having an epoxy group, a polymerizable group, an isocyanato group, an alkoxysilyl group, a silanol groups and the like], photo-curable compounds capable of curing by active light beam (ultraviolet rays and the like) (e.g. ultraviolet-curable compounds such as photo-curable monomers and oligomers), and the photo-curable compounds may be EB (electron mean)-curable compounds and the like. In addition, the photo-curable compounds such as photo-curable monomers and oligomers and photo-curable resins that may have a low molecular weight may be referred to simply "photo-curable resins".

The above-mentioned photo-curable compounds may be, for example, monomers and oligomers (or resins, particularly low molecular weight resins), and examples of the monomers include monofunctional monomers [(meth)acrylic monomers such as (meth)acrylic acid esters, vinyl monomers such as vinylpyrrolidone, and crosslinkable cyclic hydrocarbon group-containing (meth)acrylates such as isobornyl (meth) acrylate, and adamantyl (meth)acrylate], and polyfunctional monomers having at least two polymerizable unsaturated bonds [alkylene glycol di(meth)acrylate such as ethylene glycol di(meth)acrylate, propylene glycol di(meth)acrylate, butanediol di(meth)acrylate, neopentyl glycol di(meth)acrylate, and hexanediol di(meth)acrylate; (poly)oxyalkylene glycol di(meth)acrylate such as diethylene glycol di(meth) acrylate, dipropylene glycol di(meth)acrylate, and polyoxytetramethylene glycol di(meth)acrylate; crosslinkable cyclic hydrocarbon group-containing di(meth)acrylate such as tricyclodecane dimethanol di(meth)acrylate, and adamantane di(meth)acrylate; and polyfunctional monomers having about 3 to 6 polymerizable unsaturated bonds such as trimethylolpropane tri(meth)acrylate, trimethylolethane tri(meth)acrylate, pentaerythritol tri(meth)acrylate, pentaerythritol tetra(meth)acrylate, and dipentaerythritol penta(meth)acrylate.

Examples of the oligomer or resins include (meth)acrylate of bisphenol A-alkylene oxide adducts, epoxy (meth)acrylate (bisphenol A epoxy (meth)acrylate, novolak epoxy (meth)acrylate, etc.), polyester (meth)acrylate (e.g. aliphatic polyester (meth)acrylate, aromatic polyester (meth)acrylate, etc.), polyurethane (meth)acrylate (e.g. polyester urethane (meth)acrylate and polyether urethane (meth)acrylate), and silicone (meth)acrylate. These photo-curable compounds may be used alone or in combination of two or more kinds.

The above-mentioned curable resin precursors are preferably photo-curable compounds which can be cured in a short time, and examples are ultraviolet-curable compounds (monomers, oligomers and resins whose molecular weights may be low), and EB-curable compounds. Particularly, practically advantageous resin precursors are ultraviolet-curable compounds. Further, in order to improve the resistance such as scratching resistance, the photo-curable resins are preferably compounds having 2 or more (preferably 2 to 6, and more preferably 2 to 4) polymerizable unsaturated bonds in a molecule. The molecular weight of the curable resin precursors is 5000 or lower, preferably 2000 or lower, and more preferably about 1000 or lower in consideration of compatibility with polymers.

The polymers and the curable resin precursors have a glass transition temperature of, for example, −100° C. to 250° C., preferably −50° C. to 230° C., and more preferably about 0° C. to 200° C. (e.g. about 50° C. to 180° C.). In addition, it is advantageous from the viewpoint of the surface hardness that the glass transition temperature is 50° C. or higher (e.g. about 70 to 200° C.) and preferably 100° C. or higher (e.g. about 100 to 170° C.). A weight average molecular weight of the polymers may be selected within a range of, for example, 1000000 or lower and preferably about 1000 to 500000.

The curable resin precursors may be used in combination with a curing agent based on the necessity. For example, in a thermosetting resin precursor, a curing agent of amines, polycarboxylic acids or the like may be used in combination. The content of the curing agent is 0.1 to 20 parts by weight, preferably 0.5 to 10 parts by weight, and more preferably about 1 to 8 parts by weight (particularly 1 to 5 parts by weight) with respect to 100 parts by weight of the curable resin precursor, and may be about 3 to 8 parts by weight. A photopolymerization initiator may be used in combination with the photo-curable resin precursors. Examples of the above-mentioned photopolymerization initiator include conventional components, for example, acetophenones or propiophenones, benzyls, benzoins, benzophenones, and thioxanthones.

The curable resin precursors may be used in combination with a curing promoter. For example, a photo-curable resin may contain a photo-curing promoter, for example, tertiary amines (e.g. dialkylaminobenzoic acid esters), a phosphine photopolymerization promoter and the like.

In the above-mentioned method 2, at least two kinds of components are selected from the group consisting of the above-mentioned polymers and curable resin precursors and used. In the above-mentioned case of (a) combinations for causing phase separation because a plurality of polymers are non-compatible with one another, the above-mentioned polymers can be appropriately combined and used. For example, in the case where the first polymer is a styrene resin (polystyrene, styrene-acrylonitrile copolymers, and the like), as the second polymer, cellulose derivatives (e.g. cellulose esters such as cellulose acetate propionate), (meth)acrylic resins (such as poly(methyl methacrylate)), alicyclic olefin resins (such as polymers using norbornene as a monomer), polycarbonate resins, and polyester resins (such as the above-mentioned poly($C_{2-4}$ alkylene arylate copolyesters) can be used. Further, for example, in the case where the first polymer is a cellulose derivative (e.g. cellulose esters such as cellulose acetate propionate), as the second polymer, styrene resins (such as polystyrene, styrene-acrylonitrile copolymer), (meth)acrylic resins, alicyclic olefin resins (such as polymers using norbornene as a monomer), polycarbonate resins, and polyester resins (such as the above-mentioned poly($C_{2-4}$ alkylene arylate copolyesters)) can be used. In combinations of a plurality of resins, at least cellulose esters (e.g. cellulose $C_{2-4}$ alkyl carboxylic acid esters such as cellulose diacetate, cellulose triacetate, cellulose acetate propionate, and cellulose acetate butyrate) may be used.

The proportion (weight ratio) of the first polymer and the second polymer may be selected within a range of the first polymer/second polymer of 1/99 to 99/1, preferably 5/95 to 95/5, and more preferably 10/90 to 90/10, and it is generally 20/80 to 80/20 and particularly 30/70 to 70/30.

The phase separation structure produced by the spinodal decomposition is ultimately cured by active light beams (ultraviolet light and electron beams) and heat to form a cured resin. Therefore, scratching resistance can be provided for the rough surface layer and durability can be improved.

From the viewpoint of the scratching resistance after curing, at least one polymer among a plurality of polymers, for example one polymer of mutually non-compatible two polymers, (in the case of combining a first polymer and a second polymer, particularly both polymers) is preferably a polymer having functional groups reactive with the curable resin precursor in the side chains.

Examples of the polymer for forming the phase separation structure may contain the above-mentioned thermoplastic resins and other polymers besides the above-mentioned non-compatible two polymers.

Furthermore, the above-mentioned curable resin precursors (particularly, monomers or oligomers having a plurality of curable functional groups) may also be used in combination with the above-mentioned combination of a plurality of the polymers. In this case, from the viewpoint of the scratching resistance after curing, one polymer (particularly, both polymers) among a plurality of the above-mentioned polymers may be thermoplastic resins having functional groups (functional groups relating to the curing of the above-mentioned curable resin precursors) relevant to the curing reaction. The thermoplastic resins and the curable resin precursors are preferably mutually non-compatible. In this case, at least one polymer may be non-compatible with the resin precursors and other polymers may be compatible with the above-mentioned resin precursors.

The proportion (weight ratio) of the polymer and the curable resin precursor is not particularly limited and it may be selected within a range of the polymer/curable resin precursor of about 5/95 to 95/5, and preferably about 5/95 to 60/40, more preferably about 10/90 to 50/50, and particularly about 10/90 to 40/60 from the viewpoint of the surface hardness.

In the case of causing phase separation by composing the polymer using a plurality of mutually non-compatible polymers, the curable resin precursors are preferably used in combination with at least one polymer compatible at around a processing temperature among a plurality of mutually non-compatible polymers. That is, when a plurality of mutually non-compatible polymers are constituted with, for example, a first resin and a second resin, the curable resin precursors may be compatible with either one of the first polymer and the second polymer, and preferably compatible with both of the polymer components. When the precursors are compatible with both polymer components, a phase is separated into at least two phases; a mixture of the first polymer and the curable resin precursors as main components and a mixture of the second polymer and the curable resin precursors as main components.

When the compatibility of a plurality of the selected polymers is low, the polymers are effectively phase-separated during the drying step for evaporating the solvent to improve the function of the rough surface layer. The phase separation of a plurality of the polymers can easily be determined by preparing a homogeneous solution using a good solvent for both components and observing visually whether remaining solid matter becomes opaque or not during the process of gradually evaporating the solvent.

Generally, the phase-separated two-phase components are different in the refractive index from each other. The difference of the refractive indexes of the above-mentioned phase-separated two-phase components is preferably, for example, 0.001 to 0.2 and more preferably 0.05 to 0.15.

In the composition for a phase separation type antiglare layer, the solvent may be selected in accordance with types and solubility of the above-mentioned polymers and curable resin precursors to be used and may be a solvent in which at least solid matter (a plurality of polymers and curable resin precursors, reaction initiators, and other additives) can be evenly dissolved and can be used in wet type spinodal decomposition. As such a solvent, for example, ketones (acetone, methyl ethyl ketone, methyl isobutyl ketone, cyclohexanone, etc.), ethers (dioxane, tetrahydrofuran, etc.), aliphatic hydrocarbons (hexane, etc.), alicyclic hydrocarbons (cyclohexane, etc.), aromatic hydrocarbons (toluene, xylene, etc.), halogenated hydrocarbons (dichloromethane, dichloroethane, etc.), esters (methyl acetate, ethyl acetate, butyl acetate, etc.), water, alcohols (ethanol, isopropanol, butanol, cyclohexanol, etc.), cellosolves (methyl cellosolve, ethyl cellosolve, etc.), cellosolve acetates, sulfoxides (dimethyl sulfoxide, etc.), and amides (dimethylformamide, dimethylacetamide, etc.) can be exemplified, and mixed solvents thereof may be used.

The concentration of the solutes (polymers and curable resin precursors, reaction initiators, and other additives) in the composition for a phase separation type antiglare layer may be selected within limits which causes phase separation and do not impair a casting property and coatability and it is, for example, 1 to 80% by weight, preferably 5 to 60% by weight, and more preferably about 15 to 40% by weight (particularly 20 to 40% by weight).

In addition, when the surface roughness is formed by such method 2, Sm, θa and Rz can be appropriately adjusted within desired ranges by adjusting the type, the combination, the addition amount and the mixing ratio of the resins to be used for forming the rough surface layer, and further the composition and the film thickness of the surface adjustment layer.

Such formation of the rough surface layer by the method 2 is a method which can be particularly suitably applied in the third production method described above. Further, an antiglare film having a surface roughness is produced by the above-mentioned method and this film may be applied in the first production method described above.

(Method 3) Method for Forming a Rough Surface Layer by Using a Treatment for Providing Surface Roughness The method 3 is a method for forming a rough surface layer having a surface roughness by forming a coating layer composed of a resin and performing a molding treatment for providing the surface roughness to the surface of the coating layer. Such a method can be suitably carried out by a molding treatment using a mold having peaks and valleys which has a shape reversed to the surface roughness which the rough surface layer has. The mold having peaks and valleys includes such as an emboss plate and an emboss roller.

In the method 3, the formation of the surface roughness may be carried out by forming a layer with a mold having peaks and valleys after providing a composition for a rough surface layer, or the formation of the surface roughness and the formation of the rough surface layer may be carried out simultaneously by supplying the composition for a rough surface layer to an interface between the light-transmitting substrate and the mold having peaks and valleys and interposing the composition for a rough surface layer between the mold having peaks and valleys and the light-transmitting substrate. In the present invention, a flat emboss plate may also be employed in place of the emboss roller.

A surface of the mold having peaks and valleys formed on the emboss roller or the flat emboss plate can be formed by various publicly known methods such as a sand blast method or a bead shot method. The single antiglare layer formed by using an emboss plate (an emboss roller) prepared by a sand blast method is provided with a shape in which a large number of valleys are distributed in its cross-sectional profile. The single antiglare layer formed by using an emboss plate (an emboss roller) prepared by a bead shot method is provided with a shape in which a large number of peaks are distributed on upper side in its cross-sectional profile.

It is said that when the mean roughness of the surface roughness formed at the surface of the rough surface layer is the same, a rough surface layer having a shape in which a large number of peaks are distributed on the upper side has less reflection of lighting apparatuses or the like in an interior room in comparison with the rough surface layer having a shape in which a large number of the valleys are distributed on the upper side. Therefore, according to a preferable aspect of the present invention, it is preferable to form the surface roughness of the rough surface layer by using a mold having peaks and valleys which is formed to have the same shape as the surface roughness of the rough surface layer in accordance with the bead shot method.

As a mold material for forming the surface of the mold having peaks and valleys, plastics, metals, wood, and the like can be used and composites thereof may also be used. From the viewpoint of the strength and wear resistance because of repeat use, the mold material for forming the surface of the mold having peaks and valleys, metal chromium is preferable and in terms of economy or the like, an emboss plate (an emboss roller) made of iron and surface-plated with chromium is preferable.

Specific examples of the particles (beads), which are blown in forming the surface of the mold having peaks and valleys by the sand blast method or the bead shot method, include metal particles and inorganic particles such as silica, alumina, and glass. The particle size (diameter) of these particles is preferably about 30 to 200 μm. At the time of blowing these particles to the mold material, a method of blowing these particles together with a high speed gas. At that time, a proper liquid, for example, water or the like may be used in combination. Further, in the present invention, in order to improve the durability for use, the mold having peaks and valleys provided with the surface roughness is preferably plated with chromium or the like before using in terms of curing a coat and prevention of corrosion.

Such formation of the rough surface layer by the method 3 is a method which can be particularly suitably applied in the second production method described above. Further, an antiglare film having a surface roughness is produced by the above-mentioned method and this film may also be applied in the first production method described above.

As described the above-mentioned arbitrary step, in the production method of the present invention, when the above-mentioned antiglare layer is formed by forming a surface adjustment layer on the under coat rough surface layer, a method, in which the under coat rough surface layer is formed on the top surface of the light-transmitting substrate, and then the surface adjustment layer is formed, may be employed. In this case, the surface adjustment layer exhibits an antiglare function in an integrated manner with the under coat rough surface layer. That is, by forming the surface adjustment layer on the above-mentioned under coat rough surface layer, the surface roughness of the under coat rough surface layer becomes smooth, and by having surface roughness parameters within the above range, an antiglare layered body having extremely high gloss blackness while imparting an adequate antiglare property can be prepared.

Gloss blackness of an image display device is black color reproducibility in performing black color display in the image display device under a bright-room environment, and it can be evaluated by visual observation. When an reflection angle at the time when incident light to the optical layered body from the outside is reflected covers a wide range, the light is reflected in all directions (diffuse reflected) according to angles of profile irregularities of the surface of the optical layered body and reaches observer's eye, and therefore inherent black color is not reproduced (that is, only a part of diffused light reaches observer's eye). On the other hand, when incident light is reflected so as to be concentrated into the vicinity of a specular reflection angle (in the case of the antiglare layer having a gradual surface roughness), light from a light source is seldom diffuse reflected and becomes specular reflection light and light other than this specular reflection light does not reach observer's eye, and therefore it become as inherent black as a raven (clear and pure black color). In the present specification, this inherent black color is referred to as gloss blackness.

The above-mentioned under coat rough surface layer has a surface roughness at the outermost surface. Examples of such the under coat rough surface layer include the same rough surface layer as that described above. For example, the above under coat rough surface layer can be formed by the same method for forming a rough surface layer as that described above using a composition for an under coat rough surface layer. The above-mentioned composition for an under coat rough surface layer is not particularly limited and includes the same one as the above-mentioned composition for a rough surface layer.

When the production method of the present invention includes a method of forming an under coat rough surface layer and forming a surface adjustment layer on the surface of the above-mentioned under coat rough surface layer having a surface roughness, optical characteristic values (Sm, θa and Rz) of the surface roughness of the optical layered body are values of the outermost surface (surface of the surface adjustment layer) of the optical layered body including the surface adjustment layer.

With respect to the surface adjustment layer, it becomes possible to form smooth peaks and valleys by filling fine peaks and valleys existing along the surface roughness in the scale of 1/10 or less of the peak and valley scale (the peak height and the interval between peaks of the peaks and the valleys) on the roughness forming the surface roughness of the under coat rough surface layer, or it becomes possible to adjust the peak interval and the peak height of the peaks and valleys and the frequency (the number) of the peaks. Further, the surface adjustment layer may also be formed for the purposes of imparting prevention of static charge, refractive index adjustment, increase in hardness, an antifouling property and the like.

The above surface adjustment layer includes a resin binder. The above-mentioned resin binder is not particularly limited, but a transparent resin binder is preferable, and examples of the resin binder include ionizing radiation-curable resins which are resins to be cured with ultraviolet light or electron beams, and a mixture of the ionizing radiation-curable resin and a solvent-drying resin, and resins obtained by curing a thermosetting resin. More preferably, the resin binder is the ionizing radiation-curable resin. The ionizing radiation-curable resins, the mixture of the ionizing radiation-curable resin and a solvent-drying resin and the thermosetting resin are not particularly limited, and the above resins exemplified as a resin which can be used for forming the rough surface layer, can be used.

The surface adjustment layer may contain organic fine particles or inorganic fine particles for adjusting fluidity. The organic fine particles or inorganic fine particles usable for the fluidity adjustment agent are not particularly limited in the shape and for example, spherical, platy, fibrous, nonspherical, and hollow shapes are all acceptable. A particularly preferable fluidity adjustment agent is colloidal silica. Conventionally, if trying to fill and smooth fine peaks and valleys by forming a surface adjustment layer, the antiglare property has been significantly deteriorated due to excessive smoothing. However, if a coat is formed using a composition containing the colloidal silica, it is possible to achieve an antiglare property and black color reproducibility simultaneously. Actions bringing in such an effect are not clear. However, since the composition containing the colloidal silica has an excellent following property to the surface roughness by controlling its fluidity, it is estimated that in smoothing, the fine surface roughness existing at the under coat rough surface layer, which is thoroughly crashed in a conventional surface adjustment layer, can remain without being thoroughly crashed while being provided with moderate smoothness.

In the present invention, the "colloidal silica" means a colloid solution obtained by dispersing silica particles in colloidal state in water or an organic solvent. The particle size (diameter) of the colloidal silica is preferably as small as ultrafine particles with about 1 to 50 nm. In addition, the particle size of the colloidal silica in the present invention refers to an average particle diameter measured by a BET method (the average particle diameter is calculated by measuring the surface area by a BET method and carrying out conversion into the diameter assuming the particles to be truly spherical).

The above-mentioned colloidal silica is publicly known silica, and examples of commercially available silica include "Methanol Silica Sol", "MA-ST-M", "IPA-ST", "EG-ST", "EG-ST-ZL", "NPC-ST", "DMAC-ST", "MEK", "XBA-ST", and "MIBK-ST" (all are manufactured by Nissan Chemical Industries Co., Ltd.; all trade names), "OSCAL 1132", "OSCAL 1232", "OSCAL 1332", "OSCAL 1432", "OSCAL 1532", "OSCAL 1632", and "OSCAL 1132" (all are manufactured by Catalysts and Chemicals Industries Co., Ltd.; all trade names).

An amount of the above-mentioned organic fine particles or inorganic fine particles are preferably 5 to 300 in terms of fine particle weight with respect to 100 of the binder resin weight of the surface adjustment layer (fine particle weigh/binder resin weight=P/V ratio=(5 to 300)/100). If the amount of the fine particles is less than 5, the following property to the surface roughness becomes insufficient and therefore, it may become difficult to achieve black color reproducibility such as gloss blackness and an antiglare property simultaneously. If it exceeds 300, since defects are caused in terms of physical properties such as adhesion and scratching resistance and therefore, it is preferably in the above-mentioned range. The addition amount varies depending on the fine particles to be added, but the addition amount is preferably 5 to 80 in the case of colloidal silica. When it exceeds 80, the antiglare property is not fluctuated even if the particles are added furthermore and the addition becomes meaningless and if it exceeds this value, defects of the adhesion to a lower layer arise and therefore, it is preferable to keep in the range.

Further, the surface adjustment layer may have a function of imparting antistatic property, refractive index adjustment, increase in hardness and an antifouling property in addition to adjustment of the surface roughness described above. In this case, the surface adjustment layer is preferably formed from the composition for a surface adjustment layer containing one or more kinds of surface-adjusting agents selected from the group consisting of an antistatic agent, a refractive index-adjusting agent, an antifouling agent, a water repellent agent, an oil repellent agent, an anti-fingerprint agent, a highly curing agent and a hardness adjusting agent as required.

Examples of the above-mentioned antistatic agent, antifouling agent, refractive index-adjusting agent and leveling agent include the same agents as those which can be used in the formation of the rough surface layer.

The above-mentioned method for forming the surface adjustment layer is not particularly limited and the surface adjustment layer can be formed by applying the composition for a surface adjustment layer, which is obtained by mixing, for example, the above-mentioned colloidal silica, a binder resin (including resin components such as a monomer and an oligomer), a solvent, and an arbitrary component used as required, onto the rough surface layer. Examples of the above solvent include alcohols such as isopropyl alcohol, methanol and ethanol; ketones such as methyl ethyl ketone, methyl isobutyl ketone and cyclohexanone; esters such as methyl acetate, ethyl acetate and butyl acetate; halogenated hydrocarbons; aromatic hydrocarbons such as toluene and xylene; and mixtures thereof, and preferable examples include ketones and esters.

As for the above-mentioned application method and method for forming the surface adjustment layer, the same application method and the same formation method as in the above-mentioned method for forming the rough surface layer can be employed.

A layer (cured) thickness of the surface adjustment layer is preferably 0.6 μm or more and 15 μm or less (preferably 12 μm or less). A lower limit of the layer thickness is more preferably 1.5 μm or more and furthermore preferably 3 μm or more. An upper limit is more preferably 8 μm or less and furthermore preferably 5 μm or less. In addition, the thickness of the surface adjustment layer is a value calculated by measuring the thickness A of the under coat rough surface layer by the method described above and measuring the thickness B of the under coat rough surface layer+surface adjustment layer, provided with the surface adjustment layer, and subtracting the A value from the B value (in the case where there is difference of refractive index between the under coat rough surface layer and the binder resin of the surface adjustment layer, the calculation is possible by measuring A after B value measurement of the completed product). If the layer thickness is less than 0.6 μm, the antiglare property may be good, but the gloss blackness may not be improved in some cases. If the layer thickness is more than 15 μm, the gloss blackness may be remarkably excellent, but there sometimes occurs a problem that the antiglare property may not be improved.

In the present invention, as described above, the antiglare layer may be a single layer or may be a double layer. When the antiglare layer is a double layer, the antiglare layer is preferably obtained by forming the surface adjustment layer on the under coat rough surface layer. The above-mentioned method for producing an optical layered body may be a method for further forming an antistatic layer, a low refractive index layer and an antifouling layer on the rough surface layer or the surface adjustment layer. The low refractive index layer preferably has a lower refractive index than that of the rough surface layer or the surface adjustment layer. Each of the antistatic layer, the low refractive index layer and the antifouling layer may be formed by preparing a composition, which is formed by adding a resin and the like to the antistatic agent, the low refractive index agent and the antifouling agent described in a paragraph of the surface adjustment layer, and using this composition. Therefore, the antistatic agent, the low refractive index agent, the antifouling agent, and the resin may be similar.

The low refractive index layer may be formed on the rough surface layer or the surface adjustment layer. The antiglare layer having the low refractive index layer on the rough surface layer may be one substantially obtained by forming the surface adjustment layer to which a low refractive index property is imparted on the rough surface layer. Further, the antiglare layer may be one for which the low refractive index layer is provided in addition to the surface adjustment layer. The low refractive index layer contains a low refractive index agent as a refractive index adjusting agent.

The low refractive index agent has a lower refractive index than that of the rough surface layer. In accordance with a preferable aspect of the present invention, it is preferable to have a constitution in which the refractive index of the rough surface layer is 1.5 or more and the refractive index of the low refractive index agent is less than 1.5 and preferably 1.45 or less.

The low refractive index layer is a layer which plays a role in reducing the reflectance when external light (for example, a fluorescent lamp, natural light, etc.) is reflected at the surface of the optical layered body. The low refractive index layer is composed of preferably any of 1) a resin containing silica or magnesium fluoride, 2) a fluororesin having a low refractive index resin, 3) a fluororesin containing silica or magnesium fluoride, and 4) a thin film of silica or magnesium fluoride. With respect to the resins other than the above-mentioned fluororesin, the same resins as those constituting the rough surface layer and the surface adjustment layer can be employed.

Low refractive index layers of these materials preferably have a refractive index of 1.45 or less, particularly a refractive index of 1.42 or less.

Further, the thickness of the low refractive index layer is not limited, but it may be appropriately set within a range of about 30 nm to 1 μm.

As the above-mentioned fluororesin, a polymerizable compound containing fluorine atoms at least in a molecule or a polymer thereof can be used. The polymerizable compound is not particularly limited, but for example, polymerizable compounds having a curing and reactive group such as a functional group to be cured by ionizing radiation, a thermosetting polar group or the like are preferable. Further, compounds having these reactive groups simultaneously together may also be used. In contrast to this polymerizable compound, the polymer is a polymer not having the above reactive group at all.

As polymerizable compounds having an ionizing radiation-curable group containing fluorine atoms, fluorine-containing monomers having an ethylenic unsaturated bond can be widely employed. More specifically, fluorolefins (for example, fluoroethylene, vinylidene fluoride, tetrafluoroethylene, hexafluoropropylene, perfluorobutadiene, perfluoro-2, 2-dimethyl-1,3-dioxole, etc.) can be exemplified. Examples of polymerizable compounds having a (meth) acryloyloxy group include a (meth)acrylate compound containing fluorine atoms in a molecule such as 2,2,2-trifluoroethyl (meth) acrylate, 2,2,3,3,3-pentafluoropropyl (meth)acrylate, 2-(perfluorobutyl)ethyl (meth)acrylate, 2-(perfluorohexyl)ethyl (meth)acrylate, 2-(perfluorooctyl)ethyl (meth)acrylate, 2-(perfluorodecyl)ethyl (meth)acrylate, α-trifluoromethylmethacrylic acid and α-trifluoroethylmethacrylic acid; and fluorine-containing polyfunctional (meth)acrylic acid ester compounds having a fluoroalkyl group, a fluorocycloalkyl group or a fluoroalkylene group, having 1 to 14 carbon atoms, which contains at least three fluorine atoms in a molecule, and at least two (meth) acryloyloxy groups.

As the thermosetting polar groups, for example, groups for forming a hydrogen bond such as a hydroxyl group, a carboxyl group, an amino group and an epoxy group are preferable. These groups are superior in not only the adhesion to a coat but also the affinity for an inorganic ultra fine particle such as silica. Examples of the polymerizable compounds having the thermosetting polar group include 4-fluoroethylene-perfluoroalkylvinylether copolymer; fluoroethylene-hydrocarbonvinylether copolymer; and fluorine modified products of various resins such as epoxy, polyurethane, cellulose, phenol and polyimide.

As the polymerizable compounds having the ionizing radiation-curable group and the thermosetting polar group together, partially and fully fluorinated alkyl, alkenyl, or aryl esters of acrylic acid or methacrylic acid, fully or partially fluorinated vinyl ethers, fully or partially fluorinated vinyl esters, and fully or partially fluorinated vinyl ketones can be exemplified.

Further, examples of fluororesins include the following compounds.

Polymers of a monomer or a mixture of monomers, containing at least one fluorine-containing (meth)acrylate compound of the polymerizable compounds having the ionizing radiation-curable group; copolymers of at least one of above-mentioned fluorine-containing (meth)acrylate compounds and a (meth)acrylate compound not containing a fluorine atom in a molecule like methyl (meth)acrylate, ethyl (meth) acrylate, propyl (meth)acrylate, butyl (meth)acrylate and 2-ethylhexyl (meth)acrylate; and homopolymers or copolymers of fluorine-containing monomers like fluoroethylene, vinylidene fluoride, trifluoroethylene, chlorotrifluoroethylene, 3,3,3-trifluoropropylene, 1,1,2-trichloro-3,3,3-trifluoropropylene and hexafluoropropylene. Silicone-containing vinylidene fluoride copolymer prepared by including a silicone component in these copolymers can also be used. Examples of the silicone component in this case include (poly)dimethylsiloxane, (poly) diethylsiloxane, (poly) diphenylsiloxane, (poly)methylphenylsiloxane, alkyl modified (poly) dimethylsiloxane, azo group-containing (poly) dimethylsiloxane, dimethylsilicone, phenylmethylsilicone, alkyl-aralkyl modified silicone, fluorosilicone, polyether modified silicone, fatty acid ester modified silicone, methyl hydrogen silicone, silanol group-containing silicone, alkoxy group-containing silicone, phenol group-containing silicone, methacryl modified silicone, acryl modified silicone, amino modified silicone, carboxylic acid modified silicone, carbinol modified silicone, epoxy modified silicone, mercapto modified silicone, fluorine modified silicone, polyether modified silicone, and the like. Among others, silicone components having a dimethylsiloxane structure are preferable.

Furthermore, nonpolymers or polymers including following compounds can also be used as a fluororesin. That is, compounds obtained by reacting a fluorine-containing compound having at least one isocyanate group in a molecule with a compound having at least one functional group, such as an amino group, a hydroxyl group or a carboxyl group, which reacts with an isocyanate group in a molecule; and compounds obtained by reacting fluorine-containing polyol such as fluorine-containing polyether polyols, fluorine-containing alkyl polyols, fluorine-containing polyester polyols or fluorine-containing ∈-caprolactone modified polyols with a compound having an isocyanate group can be used.

Further, together with the above-mentioned polymerizable compounds or polymers containing fluorine atoms, the respective resin components described in a paragraph of the rough surface layer may also be mixed to be used. Furthermore, a curing agent for curing reactive groups, various kinds of additives for improving the coatability and imparting an antifouling property, and solvents may be appropriately used.

In the low refractive index layer, "fine particles having voids" are preferably used as a low refractive index agent. The "fine particles having voids" can reduce the refractive index of the low refractive index layer while maintaining layer strength of the low refractive index layer. In the present invention, the term "fine particles having voids" means particles having a structure in which the inside of the particle is filled with vapor and/or a porous structure including vapor is formed, and a characteristic that the refractive index is decreased in inverse proportion to a proportion which the vapor makes up of the particle compared with the particle's own refractive index. Further, in the present invention, the particle having voids includes a fine particle, in which a nano porous structure can be formed inside the coat and/or in at least a part of the coat surface, based on the configuration, the structure and the agglomerated state of the fine particles and the dispersed state of fine particles within a coat. The refractive index of the low refractive index layer using this particle can be adjusted to a refractive index of 1.30 to 1.45.

Examples of inorganic fine particles having voids include silica fine particles prepared by a technique disclosed in Japanese Kokai Publication 2001-233611. Further, silica fine particles obtained by production methods described in such as Japanese Kokai Publication Hei-7-133105, Japanese Kokai Publication 2002-79616, and Japanese Kokai Publication 2006-106714, may be used. Since the silica particle having voids is easily produced and has high particle's own hardness, their layer strength is improved and it becomes possible to adjust the refractive index to a range of about 1.20 to 1.45 when the particles are mixed with the binder to form the surface adjustment layer. Particularly, specific preferable examples of organic fine particles having voids include hollow polymer particles prepared by use of a technique disclosed in Japanese Kokai Publication 2002-80503.

Examples of the fine particle, in which a nano porous structure can be formed inside the coat and/or in at least a part of the coat surface, include, in addition to the silica particles previously described, slow-release agents produced for the purpose of increasing a specific surface area, in which various chemical substances is adsorbed on a column for filling and a porous portion of the surface; porous particles used for fixing a catalyst; and dispersed substances or agglomerated substances of hollow particles for the purpose of incorporating in a heat insulating material or a low dielectric material. Specifically, it is possible to select and use the particles within the range of the preferable particle diameter of the present invention from agglomerated substances of porous silica fine particles of commercially available Nipsil or Nipgel (both trade name) produced by Nihon Silica Kogyo Co., Ltd., and colloidal silica UP series (trade name), having a structure in which silica fine particles are linked with one another in a chain form, produced by Nissan Chemical Industries, Ltd.

An average particle diameter of the "fine particle having voids" is 5 nm or more and 300 nm or less, and preferably, a lower limit is 8 nm and an upper limit is 100 nm, and more preferably, the lower limit is 10 nm and the upper limit is 80 nm. It becomes possible to impart excellent transparency to the low refractive index layer by having the average particle diameter of the fine particles of this range. In addition, the above average particle diameter was measured by a dynamic light-scattering method. An amount of the "particles having voids" is usually about 0.1 to 500 parts by weight with respect to 100 parts by weight of a matrix resin in the low refractive index layer, and preferably about 10 to 200 parts by weight.

In forming the low refractive index layer, it is preferable to set the viscosity of the composition for a low refractive index layer in a range of 0.5 to 5 cps (25° C.) where a preferable application property is attained, and preferably 0.7 to 3 cps (25° C.). An excellent antireflection coat of visible light can be realized, a uniform thin coat can be formed without producing irregularity of application, and a low refractive index layer having particularly excellent adhesion to the substrate can be formed.

Means for curing a resin may be the same one as described in a paragraph of the antiglare layer. When heating means is used for curing the resin, preferably, a heat-polymerization initiator, which generates, for example, radicals by heat to initiate the polymerization of a polymerizable compound, is added to a fluororesin composition.

A layer thickness (nm) $d_A$ of the low refractive index layer preferably satisfies the following equation (V):

$$d_A = m\lambda/(4n_A) \quad (V),$$

wherein $n_A$ represents a refractive index of the low refractive index layer, m represents a positive odd and preferably 1, and λ is a wavelength and preferably values from 480 to 580 nm.

Further, in the present invention, it is preferable from the viewpoint of reducing a reflectance that the low refractive index layer satisfies the following equation (VI):

$$120 < n_A d_A < 145 \quad (VI).$$

The light-transmitting substrate is preferably a substrate having smoothness and heat resistance, which is superior in mechanical strength. Specific examples of materials for forming the light-transmitting substrate include thermoplastic resins such as polyester (polyethylene terephthalate, polyethylene naphthalate), triacetyl cellulose, cellulose diacetate, cellulose acetate butylate, polyester, polyamide, polyimide, polyethersulfone, polysulfone, polypropylene, polymethylpentene, polyvinyl chloride, polyvinyl acetal, polyether ketone, polymethyl methacrylate, polycarbonate and polyurethane, and preferably include polyesters (polyethylene terephthalate, polyethylene naphthalate) and triacetyl cellulose.

As the light-transmitting substrate, a film of amorphous olefin polymer (Cyclo-Olefin-Polymer: COP) having an alicyclic structure can also be used. This is a substrate in which norbornene polymers, monocyclic olefin polymers, cyclic conjugated diene polymers, and vinyl alicyclic hydrocarbon polymer resins are used, and examples of this amorphous olefin polymer include ZEONEX or ZEONOA (norbornene resin) manufactured by ZEON Corporation, SUMILITE FS-1700 manufactured by SUMITOMO BAKELITE Co., Ltd., ARTON (modified norbornene resin) manufactured by JSR Corp., APEL (cyclic olefin copolymer) manufactured by Mitsui Chemicals, Inc., TOPAS (cyclic olefin copolymer) manufactured by Ticona Inc. and OPTOREZ OZ-1000 series (alicyclic acrylic resin) manufactured by Hitachi Chemical Co., Ltd. Further, FV series (low birefringence and low photoelastic coefficient film) manufactured by Asahi Kasei Chemicals Corporation are also preferable as an alternative substrate of triacetyl cellulose.

As the light-transmitting substrate, the thermoplastic resin is preferably used in a film form, which is rich in flexibility, but plates of these thermoplastic resins may be used or plate-like bodies of glass plate may also be used in accordance with the mode of use requiring a curing property.

Preferably, the thickness of the light-transmitting substrate is 20 μm or more and 300 μm or less, and more preferably, an upper limit of the thickness is 200 μm and a lower limit is 30 μm. When the light-transmitting substrate is a plate-like body, the thickness of the light-transmitting substrate may be more than this thickness (300 μm to about 10 mm). The substrate may have been subjected to application of an anchor agent or a coating composition referred to as a primer in advance in addition to physical treatments such as a corona discharge treatment and an oxidation treatment in order to improve the adhesive property of the substrate when the rough surface layer or the antistatic layer is formed on the substrate.

The optical layered body obtained by the method for producing an optical layered body of the present invention also constitutes the present invention. With respect to a surface roughness of the optical layered body thus obtained, if denoting a mean spacing of profile irregularities by Sm, a mean inclination angle of profile irregularities by θa, and a mean roughness of the surface roughness by Rz, Sm is 50 μm or more and less than 100 μm, θa is 0.1° or more and 1.0° or less, and Rz is more than 0.2 μm and 1.0 μm or less.

By adapting Sm, θa and Rz to satisfy these values, effects can be particularly suitably achieved.

That is, the optical characteristics are controlled by controlling the shape of the surface of the optical layered body of the present invention. Here, the "surface of the optical layered body" means the outermost surface of the antiglare layer adjacent to air in any of the cases where the antiglare layer is a single layer, the antiglare layer is composed of the under coat rough surface layer and the surface adjustment layer, or the antiglare layer further has the low refractive index layer and/or arbitrary layer, and optical characteristic values of the surface roughness of the outermost surface are coincident with the optical characteristic values of the surface roughness of the optical layered body in the present invention.

[Production Apparatus]

The production apparatus of the present invention is used for the method for producing an optical layered body described above. Hereinafter, the production apparatus of the present invention will be described by use of drawings but the production apparatus of the present invention is not limited to production apparatuses shown in drawing.

First Production Apparatus

The first production apparatus of the present invention is used for the first production method described above, and is a production apparatus of an optical layered body, characterized by including a supply section to supply the light-transmitting substrate and the antiglare film having a surface roughness, and a formation section to form the above-mentioned antiglare layer on the above-mentioned light-transmitting substrate. A schematic view of the apparatus is not shown specifically, but in FIG. 9 showing briefly the second production apparatus of the present invention, the apparatus may be one not having an emboss roller 27 having peaks and valleys which has a shape reversed to the surface roughness imparted to the rough surface layer and a roller 25c. If considering FIG. 9 as the first production method, a reference numeral 23 represents a light-transmitting substrate, 21 represents an antiglare film having a surface roughness, and an adhesive layer may be provided there between.

Second Production Apparatus

The second production apparatus of the present invention is used for the second production method described above and is a production apparatus of an optical layered body, characterized by including a formation section to form the above-mentioned resin layer on the above-mentioned light-transmitting substrate and provide a surface roughness for the resin layer.

The second production apparatus will be briefly described by use of FIG. 9. FIG. 9 shows a schematic view of a second production apparatus 20 of the present invention. A light-transmitting substrate 21 is supplied through a roller 25a of a supply section and an antiglare layer (not having a surface roughness) 23 is supplied through a roller 25b of a supply section. The supplied light-transmitting substrate 21 and antiglare layer 23 are combined into one with the rollers 25a, 25b. In accordance with a preferable aspect of the present invention, a supply section to supply an adhesive (layer) may be provided and there is a process in which the light-transmitting substrate 21 and the antiglare layer 23 are combined into one with the adhesive (layer) supplied from the supply section interposed there between. The light-transmitting substrate 21 and the antiglare layer 23 combined into one are introduced in a roller emboss 27 having peaks and valleys 22 which has a shape reversed to the surface roughness provided for the rough surface layer. The light-transmitting substrate 21 and the antiglare layer 23 combined into one are sandwiched between the roller emboss 27 and the roller 25c and a desired surface roughness is formed at the antiglare layer 23 to form an optical layered body 29. The formed optical layered body 29 passes a roller 25d and becomes a product.

In accordance with a preferable aspect of the present invention, the above-mentioned formation section includes a mold having peaks and valleys which has a shape reversed to the surface roughness which the rough surface layer has, and a flat plate emboss is used in addition to the roller emboss 27 for this mold. An embossing treatment method, the roller emboss and flat plate emboss may be the same as those described in the fourth production apparatus of the present invention described later.

Third Production Apparatus

The third production apparatus of the present invention is used for the third production method described above and is a production apparatus of an optical layered body, characterized by including a supply section to supply the light-transmitting substrate, an imparting section to impart a composition for an antiglare layer (composition for a rough surface layer) to the surface of the light-transmitting substrate, and a formation section to cure the above-mentioned composition for an antiglare layer to form the above-mentioned antiglare layer having a surface roughness.

A surface roughness of the optical layered body attained by using the above-mentioned third production apparatus is also similar to the surface roughness attained by using the above-mentioned first production apparatus.

The third production apparatus will be briefly described by use of FIG. 10. FIG. 10 shows a schematic view of a third production apparatus 30 of the present invention. A light-transmitting substrate 31 is supplied in a state of being sandwiched between rollers 35a and 35b of a supply section. A coating head 33 is provided behind the rollers 35a and 35b of a supply section and a composition 34 for an antiglare layer is supplied through a pipe 36 from a liquid storage. The supplied composition 34 for an antiglare layer is supplied to a slit 39 opened toward a lower portion of the coating head 33. After the composition 34 for an antiglare layer is added to the surface of the supplied light-transmitting substrate 31 from the slit 39 to form a layer of the composition 34 for an antiglare layer, the formed layer is subjected to a curing treatment by a curing apparatus 38 provided behind the coating head 33. Accordingly, the composition 34 for an antiglare layer is cured to form a desired surface roughness at the antiglare layer 37, and thereafter an optical layered body including the cured antiglare layer 37 on the light-transmitting substrate 41 is moved through a roller 35c to produce an optical layered body.

Fourth Production Apparatus

The fourth production apparatus of the present invention is used for the fourth production method described above and includes a supply section to supply the light-transmitting substrate, a mold having peaks and valleys which has a shape reversed to the surface roughness formed at the surface of the antiglare layer, an introduction section to introduce a composition for an antiglare layer (composition for a rough surface layer) into the above-mentioned mold, and a formation section to cure the above-mentioned composition for an antiglare layer to form the above-mentioned antiglare layer having the surface roughness. A surface roughness of the optical layered body attained by using the above-mentioned fourth production apparatus is also similar to the surface roughness attained by using the above-mentioned first production apparatus.

An aspect of the fourth production apparatus will be briefly described by use of FIG. 11. FIG. 11 shows a schematic view of a fourth production apparatus (embossing apparatus 40) of the present invention.

A light-transmitting substrate 41 is supplied to an emboss roller 47 through a nip roller 45a of a supply section. A peak and valley 42, which has a shape reversed to a desired surface roughness of the antiglare layer, is formed at the surface of the emboss roller 47. A coating head 43 is provided at a lower portion of the emboss roller 47 and a composition 44 for an antiglare layer is supplied through a pipe 46 from a liquid storage (not shown). The supplied composition 44 for an antiglare layer is supplied from a slit 49 opened toward an upper portion of the coating head 43. After providing a mold surface having peaks and valleys 42 of the emboss roller 47 with the composition 44 for an antiglare layer, the emboss roller 47 rotates (in the direction of the arrow in FIG. 11) and the light-transmitting substrate 41 is brought into close contact with the composition 44 for an antiglare layer between a surface of the emboss roller 47 having peaks and valleys 42 and the nip roller 45a of a supply section. In accordance with a preferable aspect of the present invention, the light-transmitting substrate 41 may be brought into close contact with the composition 44 for an antiglare layer by supplying the composition 44 for an antiglare layer between the light-transmitting substrate 41 and the emboss roller 47 while wrapping the light-transmitting substrate 41 around the emboss roller 47 instead of forming the light-transmitting substrate 41 after providing the composition 44 for an antiglare layer for peaks and valleys 42.

A substance formed by bringing the light-transmitting substrate 41 into close contact with the composition 44 for an antiglare layer is moved to an upper portion of the emboss roller 47 and subjected to a curing treatment by a curing apparatus 48 provided above the emboss roller 47. Accordingly, a layer of the composition 44 for an antiglare layer is cured and integrated with the light-transmitting substrate 41. An optical layered body including a layer of the cured composition 44 for an antiglare layer on the light-transmitting substrate 41 is moved with a rotation of the emboss roller 47 and peeled off from the emboss roller 47 by a peeling roller 45b to produce an optical layered body involving an antiglare layer having a surface roughness.

The fourth production apparatus of the present invention has an advantage that an optical layered body, in which an antiglare layer having a desired surface roughness is formed, can be obtained without mixing the fine particles. In the present invention, the surface roughness can be formed by a method similar to the method 3 described in the method for forming an antiglare layer in the production method described above.

In the production apparatus of the present invention, the antiglare layer to be formed may be a rough surface layer alone, or may be a double layer composed of an under coat rough surface layer and a surface adjustment layer provided on the above under coat rough surface layer. When the antiglare layer is a single layer, the rough surface layer can be formed by the above-mentioned production apparatus. When the antiglare layer is the double layer, the above-mentioned production apparatus preferably has a formation section to form the under coat rough surface layer and a formation section to form the surface adjustment layer on the rough surface of the under coat rough surface layer. The under coat rough surface layer can be formed in the same manner as in the rough surface layer described above, and the above-mentioned formation section to form an under coat rough surface layer is the same as the above-mentioned formation section to form an antiglare layer.

The present invention pertains to an optical layered body having a light-transmitting substrate and an antiglare layer provided on the light-transmitting substrate, wherein the above-mentioned antiglare layer has a surface roughness at its outermost surface and is formed by using a composition for an antiglare layer, containing a resin and fine particles, and a difference n in refractive indexes between the above-mentioned resin and the above-mentioned fine particle is 0.2 or less, and if denoting a mean spacing of profile irregularities of the surface of the optical layered body by Sm, a mean inclination angle of profile irregularities by θa, and a mean roughness of the surface roughness by Rz, Sm is 50 μm or more and less than 100 μm, θa is 0.1° or more and 1.0° or less, and Rz is more than 0.2 μm and 1.0 μm or less.

The antiglare layer can be formed by a method similar to the method for forming an antiglare layer described above. Examples of the above composition for an antiglare layer, containing a resin and fine particles, include the same composition as the composition for a rough surface layer used in the method 1 for forming a rough surface layer described above.

The above Sm, θa and Rz values can be obtained by a method similar to that described above.

In the present invention, the difference n in refractive indexes between the resin and the fine particle is 0.20 or less. The above-mentioned difference n in refractive indexes is preferably adjusted within a desired range according to the aspect. More specifically, in the first aspect, the difference n in refractive indexes is 0.03 or more and 0.20 or less, and a lower limit of the difference n is preferably 0.04 or more and more preferably 0.05 or more, and an upper limit is preferably 0.12 or less and more preferably 0.10 or less. In such a first aspect, by adjusting the difference n in refractive indexes between the resin and the fine particle within the above range, it is possible to impart internal haze of the optical layered body and to prevent effectively image irregularity of LCD or the like, and scintillation (visually viewed as flicker dazzling) of LCD, produced at the time when transmitting light from a back side such as a backlight passes though the optical layered body. If aiming at realizing such characteristics as an optical layered body, it is preferable to adjust the difference n in refractive indexes between the resin and the fine particle within the above range.

On the other hand, in a second aspect, the difference n in refractive indexes between the resin and the fine particle is 0 or more and 0.05 or less, and a lower limit of the difference n is preferably 0.001 or more and more preferably 0.005 or more, and an upper limit is preferably 0.03 or less and more preferably 0.01 or less. By adjusting the difference n in refractive indexes between the resin and the fine particle within the above range, high contrast and a low haze value can be realized. If aiming at realizing such characteristics as an optical layered body, it is preferable to adjust the difference n in refractive indexes between the resin and the fine particle within the above range. The above-mentioned optical layered body of the second aspect can be particularly suitably used in a PDP, a CRT, an ELD and the like.

In the present invention, with respect to the difference n in refractive indexes between the resin and the fine particle, there are two aspects as described above. These aspects are required in order to exhibit respectively desired optical characteristics, particularly optical characteristics most suitable for modes of panels of a liquid crystal display, a PDP, a CRT and the like for which the optical layered body of the present invention is used, as an optical layered body.

In the optical layered body, a difference "H−R" between a layer thickness H (μm) of the antiglare layer and an average particle diameter R (μm) of the above-mentioned fine particles is preferably 0.6 μm or more and 15.0 μm or less. A lower limit of the difference is more preferably 0.8 μm and furthermore preferably 1.0 μm. An upper limit is more preferably 18 μm and furthermore preferably 10 μm. When two or more kinds of fine particles are used, the largest particle diameter is determined as R. By adjusting "H−R" within the above range, a surface roughness formed by the fine particles can be brought into a level at which an antiglare property can be maintained. If the difference exceeds the upper limit, smoothness is too intensive and the antiglare property cannot be maintained.

According to a preferable aspect of the present invention, in the optical layered body, when the total weight per unit surface area of the fine particles is denoted by m and the total weight per unit surface area of the resin is denoted by M, a total weight ratio (m/M) per unit surface area of the fine particle to the resin is preferably 0.01 or more and 1.2 or less, and a lower limit of the ratio is preferably 0.012 and more preferably 0.015, and an upper limit is preferably 1.0 and more preferably 0.3.

Definitions and measuring methods of various parameters required in the present invention will be described below.

Measurement of Refractive Index

The refractive index of a cured coat such as a surface adjustment layer was measured according to JIS K 7142 using an Abbe refractometer.

Measurement of Refractive Index, Layer Thickness

The refractive index and the layer thickness can also be measured by the following method in addition to the method described above. A spectral reflectance of a film formed by laminating a layer, measurement of which is desired, was measured as a specular reflectance at an incidence angle of 5° in a wavelength range of 380 to 780 nm by a spectrophotometer MPC 3100 manufactured by Shimadzu Corporation (in addition, when a specular reflectance at an incidence angle of 5° was measured, a black tape (manufactured by Teraoka Seisakusho Co., Ltd.) was stuck on the side opposite to a face of the film to be measured in order to prevent back reflection of the film which is an optical layered body), and a thickness of an optical layer was determined from a $\lambda/4$ value of the spectrum to calculate a refractive index based on the thickness of an optical layer. Also, a layer thickness was determined from the results of reflection spectrum. Here, a refractive index at a wavelength of 550 nm was adopted as a typical value.

Haze Value

The haze value can be measured according to JIS K-7136. Examples of the equipment used for measurement include a reflection and transmittance meter HR-150 (manufactured by Murakami Color Research Laboratory Co., Ltd.). The haze is measured with the coated surface directed to a light source.

Surface haze can be measured in the following manner. A resin solution prepared by diluting a resin (including resin components such as monomer and oligomer) such as pentaerythritol triacrylate with toluene so as to be 60% in solid content is applied onto the surface roughness of the outermost surface of the optical layered body in such away that a dried film thickness is 8 µm with a wire bar. Accordingly, the surface roughness of the antiglare layer is buried and the outermost layer becomes a smooth layer. When a composition constituting the optical layered body contains a leveling agent and therefore a re-coating agent tends to be repelled and hard to become wet, an antiglare film may previously be subjected to a saponification treatment (film is immersed in a 2 mol/liter NaOH (or KOH) solution of 55° C. for 3 minutes, and then the film is washed with water and the water droplets are wiped thoroughly with Kim-Wipe, and then the film is dried in an oven of 50° C. for 1 minute) to carry out a hydrophilic treatment. This film with the leveled surface becomes a state of not having haze due to the surface roughness but having only internal haze. This haze can be determined as an internal haze. Then, by subtracting the internal haze from haze of the original film (total haze), haze (surface haze) resulting from only the surface roughness is determined. The internal haze value is preferably 60 or less.

A polarizer including a polarizing element, wherein the optical layered body of the present invention is provided on the surface of the above-mentioned polarizing element by bonding a light-transmitting substrate to the surface of the polarizing element, also constitutes the present invention.

The above-mentioned polarizing element is not particularly limited, and as the polarizing element, for example, a polyvinyl alcohol film, a polyvinyl formal film, a polyvinyl acetal film or an ethylene-vinyl acetate copolymer saponified film, which is dyed with iodine or the like and stretched, can be used. In laminating the polarizing element and the optical layered body of the present invention, preferably, the light-transmitting substrate (preferably triacetyl cellulose film) is subjected to a saponification treatment. By the saponification treatment, adhesion becomes good and an antistatic effect can be attained.

An image display device including a light-transmitting display and a light source apparatus to irradiate the above-mentioned light-transmitting display from the backside, characterized by including the optical layered body of the present invention or the polarizer of the present invention at the surfaces of the above-mentioned light-transmitting display, also constitutes the present invention.

The image display device in accordance with the present invention may be basically composed of a light source apparatus, a display element and the optical layered body in accordance with the present invention. The image display device is used for transmissive displays, particularly for displays of televisions, computers, word processors or the like. Particularly, it is used for the surfaces of displays for high definition images such as CRTs, PDPs, liquid crystal panels, and the like.

When the image display device in accordance with the present invention is a liquid crystal display device, a light source of the light source apparatus irradiates from the underside of the optical layered body in accordance with the present invention. In addition, in the STN type liquid crystal display device, a retardation plate may be inserted between a liquid crystal display element and the polarizer. An adhesive layer may be provided between the respective layers of this liquid crystal display device as required.

Effect of the Invention

In accordance with the method for producing an optical layered body of the present invention, an optical layered body, which has properties such as an antiglare property, scintillation prevention and black color reproducibility like gloss blackness simultaneously, can be produced.

BRIEF DESCRIPTIONS OF THE DRAWINGS

Figure 14:
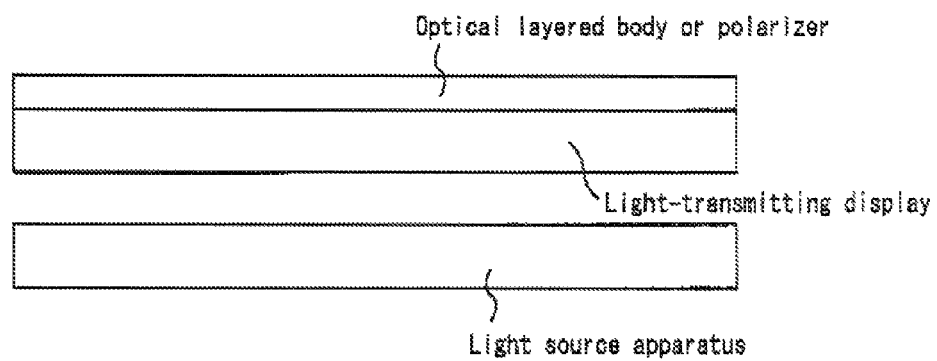

FIG. 14 is a schematic view of an image display device comprising a light-transmitting display and a light source apparatus to irradiate the light-transmitting display from the backside, wherein the image display device comprises an optical layered body according to the present invention or a polarizer comprising a polarizing element, wherein the optical layered body is provided on the surface of the polarizing element opposed to a face where the antiglare layer in the optical layered body is present, at the surfaces of the light-transmitting display.

EXPLANATION OF THE NUMERICAL SYMBOLS 1 light-transmitting substrate
2 rough surface layer
3 adhesive layer
4 resin layer
5 under coat rough surface layer
6 surface adjustment layer
7 low refractive index layer
21 light-transmitting substrate
22 peaks and valleys
23 resin layer
25a, 25b, 25c, 25d roller
27 roller emboss
29 optical layered body
31 light-transmitting substrate
33 coating head
34 composition for an antiglare layer
35a, 35b, 35c roller
36 pipe
37 antiglare layer
38 curing apparatus
39 slit
40 embossing apparatus
41 light-transmitting substrate
42 peaks and valleys
43 coating head
44 composition for an antiglare layer
45a nip roller
45b release roller
46 pipe
47 emboss roller
48 curing apparatus
49 slit

BEST MODE FOR CARRYING OUT THE INVENTION

Hereinafter, the present invention will be described in more detail based on examples. The contents of the present invention will be described by way of the following embodiments, but the contents of the present invention are not to be construed to limit to these embodiments. "Part(s)" and "%" refer to "part(s) by weight" and "% by weight", unless otherwise specified.

Composition 1 for Single Antiglare Layer

| (Ultraviolet-curable resin) | |
|---|---|
| Pentaerythritol triacrylate (PETA) (manufactured by Nippon Kayaku Co., Ltd., refractive index 1.51) | 65 parts by weight |
| Isocyanuric acid modified diacrylate M-215 (manufactured by Toagosei Co., Ltd.) | 35 parts by weight |
| Polymethyl methacrylate (Molecular weight 75000) | 10 parts by weight |
| (Photo-curing initiator) | |
| Irgacure 184 (manufactured by Ciba Specialty Chemicals Inc.) | 6 parts by weight |
| Irgacure 907 (manufactured by Ciba Specialty Chemicals Inc.) | 1 part by weight |
| (First light transmitting fine particle) | |
| Monodisperse acrylic bead (particle diameter 3.0 μm, refractive index 1.535) | 5 parts by weight |
| (Second light transmitting fine particle) | |
| Styrene bead (manufactured by Soken Chemical & Engineering Co., Ltd., particle diameter 3.5 μm, refractive index 1.60) | 7 parts by weight |
| (Leveling agent) | |
| Silicone leveling agent (manufactured by Dainichiseika Color & Chemicals Mfg. Co., Ltd.) | 0.045 parts by weight |
| (Solvent) | |
| Toluene | 64 parts by weight |
| Cyclohexanone | 16 parts by weight |

A composition was prepared by adequately mixing the above materials. This composition was filtrated with a polypropylene filter having a pore size of 30 μm to prepare a composition 1 for a single antiglare layer having a solid content of 60% by weight.

Composition 2 for Single Antiglare Layer

| (Ultraviolet-curable resin) | |
|---|---|
| Pentaerythritol triacrylate (PETA) (refractive index 1.51) | 20 parts by weight |
| Cellulose acetate propionate (molecular weight 50000) | 0.4 parts by weight |
| (Photo-curing initiator) | |
| Irgacure 184 (manufactured by Ciba Specialty Chemicals Inc.) | 1.2 parts by weight |
| Irgacure 907 (manufactured by Ciba Specialty Chemicals Inc.) | 0.2 parts by weight |
| (Fine particle) | |
| Nonspherical silica (average particle diameter 1.5 μm, subjected to a surface-hydrophobing treatment by a silane coupling agent) | 0.88 parts by weight |
| (Leveling agent) | |
| Silicone leveling agent manufactured by Dainichiseika Color & Chemicals Mfg. Co., Ltd. | 0.012 parts by weight |
| (Solvent) | |
| Toluene | 35 parts by weight |
| Methyl isobutyl ketone | 6.7 parts by weight |

A composition was prepared by adequately mixing the above materials. This composition was filtrated with a polypropylene filter having a pore size of 30 μm to prepare a composition 2 for a single antiglare layer having a solid content of 35% by weight.

Composition 3 for Single Antiglare Layer

| (Ultraviolet-curable resin) | |
|---|---|
| Pentaerythritol triacrylate (PETA) (refractive index 1.51) | 20 parts by weight |
| Polymethyl methacrylate (Molecular weight 75000) | 1 part by weight |
| (Photo-curing initiator) | |
| Irgacure 184 (manufactured by Ciba Specialty Chemicals Inc.) | 1.2 parts by weight |
| Irgacure 907 (manufactured by Ciba Specialty Chemicals Inc.) | 0.2 parts by weight |
| (Fine particle) | |
| Monodisperse styrene bead (particle diameter 3.5 μm, refractive index 1.60) | 1.2 parts by weight |
| (Leveling agent) | |
| Silicone leveling agent (manufactured by Dainichiseika Color & Chemicals Mfg. Co., Ltd.) | 0.012 parts by weight |
| (Solvent) | |
| Toluene | 37.2 parts by weight |
| Methyl isobutyl ketone | 6.6 parts by weight |

A composition was prepared by adequately mixing the above materials. This composition was filtrated with a polypropylene filter having a pore size of 30 μm to prepare a composition 3 for a single antiglare layer having a solid content of 35% by weight.

Composition 4 for Single Antiglare Layer

| (Ultraviolet-curable resin) | |
|---|---|
| Pentaerythritol triacrylate (PETA) (refractive index 1.51) | 12.0 parts by weight |
| Isocyanuric acid modified diacrylate M-215 (manufactured by Toagosei Co., Ltd.) | 8.0 parts by weight |
| Polymethyl methacrylate (Molecular weight 75000) | 2 parts by weight |
| (Photo-curing initiator) | |
| Irgacure 184 (manufactured by Ciba Specialty Chemicals Inc.) | 1.32 parts by weight |
| Irgacure 907 (manufactured by Ciba Specialty Chemicals Inc.) | 0.22 parts by weight |
| (First light transmitting fine particle) | |
| Monodisperse styrene-acrylic copolymer bead (particle diameter 3.5 μm, refractive index 1.555) | 4.84 parts by weight |
| (Second light transmitting fine particle) | |
| Monodisperse styrene bead (particle diameter 3.5 μm, refractive index 1.60) | 0.55 parts by weight |
| (Leveling agent) | |
| Silicone leveling agent manufactured by Dainichiseika Color & Chemicals Mfg. Co., Ltd. | 0.0077 parts by weight |

A composition was prepared by adding a mixed solvent of toluene and cyclohexanone in proportions of 6:4 to the above materials so as to be 38% by weight in a total solid content and adequately mixing the resulting mixture. This composition was filtrated with a polypropylene filter having a pore size of 30 μm to prepare a composition 4 for a single antiglare layer.

Composition 5 for Single Antiglare Layer

| (Resin) | |
|---|---|
| Cellulose acetate propionate (manufactured by East Chemical Japan Ltd., CAP 482-20) | 0.95 parts by weight |
| Reactive oligomer [A compound obtained by the addition reaction of 3,4-epoxycyclohexenyl methyl acrylate with a part of a carboxyl group of a (meth)acrylic acid-(meth)acrylate copolymer; manufactured by Daicel-UCB Co., Ltd., CYCLOMER P] | 16.25 parts by weight |
| Dipentaerythritol hexaacrylate (DPHA) | 15.8 parts by weight |
| (Photopolymerization initiator) | |
| Irgacure 184 (manufactured by Ciba Specialty Chemicals Inc.) | 25 parts by weight |
| (Solvent) | |
| Methyl ethyl ketone | 51 parts by weight |
| Butanol | 17 parts by weight |

The above materials were appropriately added and the resulting mixture was adequately mixed to prepare a composition. This composition was filtrated with a polypropylene filter having a pore size of 30 μm to form a composition 5 for a single antiglare layer having a solid content of 33.5% by weight.

Composition 6 for Single Antiglare Layer

| (Ultraviolet-curable resin) | |
|---|---|
| Pentaerythritol triacrylate (PETA) (refractive index 1.51) | 50 parts by weight |
| (Photo-curing initiator) | |
| Irgacure 184 (manufactured by Ciba Specialty Chemicals Inc.) | 1.50 parts by weight |
| Irgacure 907 (manufactured by Ciba Specialty Chemicals Inc.) | 1.50 parts by weight |

The PETA was warmed for one hour in an oven of 40° C., and then two kinds of photo-curing initiators were added gradually to the PETA while stirring the PETA, and the resulting mixture was warmed for another hour in the oven of 40° C. Thereafter, the mixture was re-stirred to dissolve the photo-curing initiator completely to prepare a composition 6 for a single antiglare layer having a solid content of 100% by weight.

Composition 7 for Single Antiglare Layer

| (Ultraviolet-curable resin) | |
|---|---|
| Polyfunctional urethane acrylate UV-1700B (manufactured by Nippon Synthetic Chemical Industry Co., Ltd., refractive index 1.51) | 16 parts by weight |
| Isocyanuric acid modified diacrylate M-215 (manufactured by Toagosei Co., Ltd.) | 2 parts by weight |
| Polymethyl methacrylate (Molecular weight 75000) | 2 parts by weight |
| (Photo-curing initiator) | |
| Irgacure 184 (manufactured by Ciba Specialty Chemicals Inc.) | 1.2 parts by weight |
| Irgacure 907 (manufactured by Ciba Specialty Chemicals Inc.) | 0.2 parts by weight |

-continued

| (Fine particle) | |
|---|---|
| Monodisperse styrene bead (particle diameter 3.5 μm, refractive index 1.60) | 0.6 parts by weight |
| (Leveling agent) | |
| Silicone leveling agent (manufactured by Dainichiseika Color & Chemicals Mfg. Co., Ltd.) | 0.0132 parts by weight |

A composition was prepared by adding a mixed solvent of toluene and cyclohexanone in proportions of 6:4 to the above materials so as to be 40% by weight in a total solid content and adequately mixing the resulting mixture. This composition was filtrated with a polypropylene filter having a pore size of 30 μm to prepare a composition 7 for a single antiglare layer.

Composition 8 for Single Antiglare Layer

| (Ultraviolet-curable resin) | |
|---|---|
| Pentaerythritol triacrylate (PETA) (refractive index 1.51) | 12.0 parts by weight |
| Isocyanuric acid modified diacrylate M-215 (manufactured by Toagosei Co., Ltd.) | 8.0 parts by weight |
| Polymethyl methacrylate (Molecular weight 75000) | 2 parts by weight |
| (Photo-curing initiator) | |
| Irgacure 184 (manufactured by Ciba Specialty Chemicals Inc.) | 1.32 parts by weight |
| Irgacure 907 (manufactured by Ciba Specialty Chemicals Inc.) | 0.22 parts by weight |
| (First light transmitting fine particle) | |
| Monodisperse acrylic bead (particle diameter 2.0 μm, refractive index 1.53) | 4 parts by weight |
| (Second light transmitting fine particle) | |
| Monodisperse styrene bead (particle diameter 1.3 μm, refractive index 1.60) | 6 parts by weight |
| (Leveling agent) | |
| Silicone leveling agent manufactured by Dainichiseika Color & Chemicals Mfg. Co., Ltd. | 0.0077 parts by weight |

A composition was prepared by adding a mixed solvent of toluene and cyclohexanone in proportions of 6:4 to the above materials so as to be 38% by weight in a total solid content and adequately mixing the resulting mixture. This composition was filtrated with a polypropylene filter having a pore size of 30 μm to prepare a composition 8 for a single antiglare layer.

Compositions for Under Coat Rough Surface Layer

Composition 1 for Under Coat Rough Surface Layer

| (Ultraviolet-curable resin) | |
|---|---|
| Pentaerythritol triacrylate (PETA) (refractive index 1.51) | 2.18 parts by weight |
| Dipentaerythritol hexaacrylate (DPHA) (refractive index 1.51) | 0.98 parts by weight |
| Polymethyl methacrylate (Molecular weight 75000) | 0.31 parts by weight |
| (Photo-curing initiator) | |
| Irgacure 184 (manufactured by Ciba Specialty Chemicals Inc.) | 0.20 parts by weight |
| Irgacure 907 (manufactured by Ciba Specialty Chemicals Inc.) | 0.03 parts by weight |

-continued

| (First light transmitting fine particle) | |
|---|---|
| Monodisperse acrylic bead (particle diameter 9.5 μm, refractive index 1.535) | 0.74 parts by weight |
| (Second light transmitting fine particle) | |
| Nonspherical silica ink (average particle diameter 1.5 μm, solid content 60%, silica component is 15% of a total solid content) | 1.46 parts by weight |
| (Leveling agent) | |
| Silicone leveling agent (manufactured by Dainichiseika Color & Chemicals Mfg. Co., Ltd.) | 0.02 parts by weight |
| (Solvent) | |
| Toluene | 5.53 parts by weight |
| Anone | 1.55 parts by weight |

A composition having a solid content of 40.5% by weight was prepared by adequately mixing the above materials. This composition was filtrated with a polypropylene filter having a pore size of 30 μm to prepare a composition 1 for an under coat rough surface layer.

Composition 2 for Under Coat Rough Surface Layer

| (Ultraviolet-curable resin) | |
|---|---|
| Pentaerythritol triacrylate (PETA) (refractive index 1.51) | 2.20 parts by weight |
| Isocyanuric acid modified diacrylate M-215 (manufactured by Nippon Kayaku Co., Ltd., refractive index 1.51) | 1.21 parts by weight |
| Polymethyl methacrylate (Molecular weight 75000) | 0.34 parts by weight |
| (Photo-curing initiator) | |
| Irgacure 184 (manufactured by Ciba Specialty Chemicals Inc.) | 0.22 parts by weight |
| Irgacure 907 (manufactured by Ciba Specialty Chemicals Inc.) | 0.04 parts by weight |
| (First light transmitting fine particle) | |
| Monodisperse acrylic bead (particle diameter 9.5 μm, refractive index 1.535) | 0.82 parts by weight |
| (Second light transmitting fine particle) | |
| Nonspherical silica ink (average particle diameter 1.5 μm, solid content 60%, silica component is 15% of a total solid content) | 1.73 parts by weight |
| (Leveling agent) | |
| Silicone leveling agent (manufactured by Dainichiseika Color & Chemicals Mfg. Co., Ltd.) | 0.02 parts by weight |
| (Solvent) | |
| Toluene | 5.88 parts by weight |
| Anone | 1.55 parts by weight |

A composition having a solid content of 40.5% by weight was prepared by adequately mixing the above materials. This composition was filtrated with a polypropylene filter having a pore size of 30 μm to prepare a composition 2 for an under coat rough surface layer.

Composition 3 for Under Coat Rough Surface Layer

| (First light transmitting fine particle) | |
|---|---|
| Monodisperse acrylic bead (particle diameter 7.0 μm, refractive index 1.535) | 20 parts by weight |

-continued

| (Second light transmitting fine particle) | |
|---|---|
| Monodisperse styrene bead (particle diameter 3.5 μm, refractive index 1.60) | 16.5 parts by weight |
| (Third light transmitting fine particle) | |
| Nonspherical silica: average particle diameter 2.5 μm | 2 parts by weight |
| (Ultraviolet-curable resin) | |
| Pentaerythritol triacrylate (PETA) (refractive index 1.51) | 100 parts by weight |
| (Photo-curing initiator) | |
| Irgacure 184 (manufactured by Ciba Specialty Chemicals Inc.) | 6 parts by weight |
| Irgacure 907 (manufactured by Ciba Specialty Chemicals Inc.) | 1 part by weight |
| (Polymer) | |
| Polymethyl methacrylate (Molecular weight 75000) | 10 parts by weight |
| (Leveling agent) | |
| Silicone leveling agent manufactured by Dainichiseika Color & Chemicals Mfg. Co., Ltd. | 0.045 parts by weight |
| (Solvent) | |
| Toluene | 174.4 parts by weight |
| Cyclohexanone | 43.6 parts by weight |

The above materials were appropriately added and the resulting mixture was adequately mixed. This composition was filtrated with a polypropylene filter having a pore size of 30 μm to form a composition 3 for an under coat rough surface layer having a solid content of 40.5% by weight.

Composition 4 for Under Coat Rough Surface Layer

| (First light transmitting fine particle) | |
|---|---|
| Monodisperse acrylic bead (particle diameter 7.0 μm, refractive index 1.535) | 20 parts by weight |
| (Second light transmitting fine particle) | |
| Monodisperse styrene bead (particle diameter 3.5 μm, refractive index 1.60) | 2.5 parts by weight |
| (Third light transmitting fine particle) | |
| Nonspherical silica: average particle diameter 2.5 μm | 2 parts by weight |
| (Ultraviolet curable resin) | |
| Pentaerythritol triacrylate (PETA) (refractive index 1.51) | 100 parts by weight |
| (Photo-curing initiator) | |
| Irgacure 184 (manufactured by Ciba Specialty Chemicals Inc.) | 6 parts by weight |
| Irgacure 907 (manufactured by Ciba Specialty Chemicals Inc.) | 1 part by weight |
| (Polymer) | |
| Polymethyl methacrylate (Molecular weight 75000) | 10 parts by weight |
| (Leveling agent) | |
| Silicone leveling agent manufactured by Dainichiseika Color & Chemicals Mfg. Co., Ltd. | 0.045 parts by weight |
| (Solvent) | |
| Toluene | 158 parts by weight |
| Cyclohexanone | 39.5 parts by weight |

The above materials were appropriately added and the resulting mixture was adequately mixed. This composition was filtrated with a polypropylene filter having a pore size of 30 μm to form a composition 4 for an under coat rough surface layer having a solid content of 40.5% by weight.

Composition 5 for Under Coat Rough Surface Layer

| (Ultraviolet-curable resin) | |
|---|---|
| Polyfunctional urethane acrylate UV-1700B (manufactured by Nippon Synthetic Chemical Industry Co., Ltd., refractive index 1.51) | 16 parts by weight |
| Isocyanuric acid modified diacrylate M-215 (manufactured by Toagosei Co., Ltd.) | 4 parts by weight |
| Polymethyl methacrylate (Molecular weight 75000) | 2 parts by weight |
| (Photo-curing initiator) | |
| Irgacure 184 (manufactured by Ciba Specialty Chemicals Inc.) | 1.2 parts by weight |
| Irgacure 907 (manufactured by Ciba Specialty Chemicals Inc.) | 0.2 parts by weight |
| (Fine particle) | |
| Monodisperse styrene bead (particle diameter 3.5 μm, refractive index 1.60) | 1.78 parts by weight |
| (Leveling agent) | |
| Silicone leveling agent manufactured by Dainichiseika Color & Chemicals Mfg. Co., Ltd. | 0.0132 parts by weight |

A composition was prepared by adding a mixed solvent of toluene and cyclohexanone in proportions of 6:4 to the above materials so as to be 20% by weight in a total solid content and adequately mixing the resulting mixture. This composition was filtrated with a polypropylene filter having a pore size of 30 μm to prepare a composition 6 for an under coat rough surface layer.

Composition 6 for Under Coat Rough Surface Layer

| (First light transmitting fine particle) | |
|---|---|
| Monodisperse acrylic bead (particle diameter 7.0 μm, refractive index 1.535) | 20 parts by weight |
| (Second light transmitting fine particle) | |
| Monodisperse styrene bead (particle diameter 3.5 μm, refractive index 1.60) | 33 parts by weight |
| (Third light transmitting fine particle) | |
| Nonspherical silica: average particle diameter 2.5 μm | 1 part by weight |
| (Ultraviolet-curable resin) | |
| Pentaerythritol triacrylate (PETA) (refractive index 1.51) | 100 parts by weight |
| (Photo-curing initiator) | |
| Irgacure 184 (manufactured by Ciba Specialty Chemicals Inc.) | 6 parts by weight |
| Irgacure 907 (manufactured by Ciba Specialty Chemicals Inc.) | 1 part by weight |
| (Polymer) | |
| Polymethyl methacrylate (Molecular weight 75000) | 10 parts by weight |
| (Leveling agent) | |
| Silicone leveling agent manufactured by Dainichiseika Color & Chemicals Mfg. Co., Ltd. | 0.045 parts by weight |
| (Solvent) | |
| Toluene | 205.3 parts by weight |
| Cyclohexanone | 51.3 parts by weight |

The above materials were appropriately added and the resulting mixture was adequately mixed. This composition was filtrated with a polypropylene filter having a pore size of 30 μm to form a composition 7 for an under coat rough surface layer having a solid content of 40% by weight.

Composition 1 for Surface Adjustment Layer

| (Ultraviolet-curable resin) | |
|---|---|
| UV-1700B (manufactured by Nippon Synthetic Chemical Industry Co., Ltd., refractive index 1.51) | 31.1 parts by weight |
| Aronix M-315 (trade name, triacrylate of an ethylene oxide (3 moles) addition product of isocyanuric acid manufactured by Toagosei Co., Ltd.) | 10.4 parts by weight |
| (Photo-curing initiator) | |
| Irgacure 184 (manufactured by Ciba Specialty Chemicals Inc.) | 1.49 parts by weight |
| Irgacure 907 (manufactured by Ciba Specialty Chemicals Inc.) | 0.41 parts by weight |
| (Antifouling agent) | |
| UT-3971 (manufactured by Nippon Synthetic Chemical Industry Co., Ltd.) | 2.07 parts by weight |
| (Solvent) | |
| Toluene | 48.76 parts by weight |
| Cyclohexanone | 5.59 parts by weight |

A composition was prepared by adequately mixing the above components.

This composition was filtrated with a polypropylene filter having a pore size of 10 μm to prepare a composition 1 for a surface adjustment layer having a solid content of 45% by weight.

Composition 2 for Surface Adjustment Layer

| (Ultraviolet-curable resin) | |
|---|---|
| UV-1700B (manufactured by Nippon Synthetic Chemical Industry Co., Ltd., refractive index 1.51) | 31.1 parts by weight |
| Aronix M-315 (trade name, triacrylate of an ethylene oxide (3 moles) addition product of isocyanuric acid manufactured by Toagosei Co., Ltd.) | 10.4 parts by weight |
| (Photo-curing initiator) | |
| Irgacure 184 (manufactured by Ciba Specialty Chemicals Inc.) | 1.49 parts by weight |
| Irgacure 907 (manufactured by Ciba Specialty Chemicals Inc.) | 0.41 parts by weight |
| (Antifouling agent) | |
| UT-3971 (manufactured by Nippon Synthetic Chemical Industry Co., Ltd.) | 2.07 parts by weight |
| (Solvent) | |
| Toluene | 525.18 parts by weight |
| Cyclohexanone | 60.28 parts by weight |

A composition was prepared by adequately mixing the above components.

This composition was filtrated with a polypropylene filter having a pore size of 10 μm to prepare a composition 2 for a surface adjustment layer having a solid content of 40.5% by weight.

Composition 3 for Surface Adjustment Layer (P/V=30/100)

| Colloidal silica slurry (MIBK dispersion); solid content 40%, average particle diameter 20 nm | 2.91 parts by weight |
|---|---|
| (Ultraviolet-curable resin) | |
| UV-1700B (ultraviolet-curable resin; manufactured by Nippon Synthetic Chemical Industry Co., Ltd., solid content 60% MIBK) | 6.10 parts by weight |
| Aronix M-215 (ultraviolet curable resin; diacrylate of an ethylene oxide (2 moles) addition product of isocyanuric acid, manufactured by Toagosei Co., Ltd., solid content 60% MIBK) | 1.52 parts by weight |
| (Photo-curing initiator) | |
| Irgacure 184 (Photo-curing initiator; manufactured by Ciba Specialty Chemicals Inc.) | 0.018 parts by weight |
| Irgacure 907 (Photo-curing initiator; manufactured by Ciba Specialty Chemicals Inc.) | 0.003 parts by weight |
| (Leveling agent) | |
| Silicone leveling agent manufactured by Dainichiseika Color & Chemicals Mfg. Co., Ltd. | 0.0085 parts by weight |
| (Solvent) | |
| MIBK: methyl isobutyl ketone | 2.06 parts by weight |
| Cyclohexanone | 0.41 parts by weight |

A composition was prepared by adequately mixing the above components.

This composition was filtrated with a polypropylene filter having a pore size of 30 μm to prepare a composition 3 for a surface adjustment layer having a solid content of 45% by weight.

EXAMPLE 1

Formation of Under Coat Rough Surface Layer

Using a triacetyl cellulose film (TD 80U, manufactured by FUJIFILM Corporation) having a thickness of 80 μm as a transparent substrate, the composition 1 for an under coat rough surface layer was applied onto the film with a wire wound rod for coating (Mayer bar (metering coating rod)) #14, and the applied composition 1 was heated to dry for 1 minute in an oven of 70° C. to evaporate the solvent fraction, and then a coat was cured by irradiating the coat with ultraviolet light in such a way that an exposure becomes 30 mJ to form an undercoat rough surface layer.

Formation of Surface Adjustment Layer

Furthermore, the composition 1 for a surface adjustment layer was applied onto the under coat rough surface layer with a wire wound rod for coating (Mayer bar (metering coating rod)) #12, and the applied composition 1 was heated to dry for 1 minute in an oven of 70° C. to evaporate the solvent fraction, and then a coat was cured by irradiating the coat with ultraviolet light in such a way that an exposure becomes 100 mJ under nitrogen purge (oxygen content 200 ppm or less) to form a surface adjustment layer to obtain an antiglare optical layered body. (The total thickness of the antiglare layer on the substrate: about 16.5 μm)

EXAMPLE 2

Formation of Under Coat Rough Surface Layer

Using a triacetyl cellulose film (TD 80U, manufactured by FUJIFILM Corporation) having a thickness of 80 μm as a transparent substrate, the composition 4 for an under coat rough surface layer was applied onto the film with a wire wound rod for coating (Mayer bar (metering coating rod)) #14, and the applied composition 4 was heated to dry for 1 minute in an oven of 70° C. to evaporate the solvent fraction, and then a coat was cured by irradiating the coat with ultraviolet light in such a way that an exposure becomes 30 mJ to form an undercoat rough surface layer. Use of the fine particle, in which a difference in refractive indexes between the fine particle and the binder resin was up to 0.09, in the under coat rough surface layer made it possible to exert an internal diffusion effect and to prevent scintillation more effectively.

Formation of Surface Adjustment Layer

Furthermore, the composition 3 for a surface adjustment layer was applied onto the under coat rough surface layer with a wire wound rod for coating (Mayer bar (metering coating rod)) #10, and the applied composition 3 was heated to dry for 1 minute in an oven of 70° C. to evaporate the solvent fraction, and then a coat was cured by irradiating the coat with ultraviolet light in such a way that an exposure becomes 100 mJ under nitrogen purge (oxygen content 200 ppm or less) to form a surface adjustment layer to obtain an antiglare optical layered body. (The total thickness of the antiglare layer on the substrate: about 12.5 μm)

EXAMPLE 3

Formation of Under Coat Rough Surface Layer

Using a triacetyl cellulose film (TD 80U, manufactured by FUJIFILM Corporation) having a thickness of 80 μm as a transparent substrate, the composition 3 for an under coat rough surface layer was applied onto the film with a wire wound rod for coating (Mayer bar (metering coating rod)) #14, and the applied composition 3 was heated to dry for 1 minute in an oven of 70° C. to evaporate the solvent fraction, and then a coat was cured by irradiating the coat with ultraviolet light in such a way that an exposure becomes 30 mJ to form an undercoat rough surface layer. Use of the fine particle, in which a difference in refractive indexes between the fine particle and the binder resin was up to 0.09, in the under coat rough surface layer made it possible to exert an internal diffusion effect and to prevent scintillation more effectively.

Formation of Surface Adjustment Layer

Furthermore, the composition 3 for a surface adjustment layer was applied onto the under coat rough surface layer with a wire wound rod for coating (Mayer bar (metering coating rod)) #8, and the applied composition 3 was heated to dry for 1 minute in an oven of 70° C. to evaporate the solvent fraction, and then a coat was cured by irradiating the coat with ultraviolet light in such a way that an exposure becomes 100 mJ under nitrogen purge (oxygen content 200 ppm or less) to form a surface adjustment layer to obtain an antiglare optical layered body. (The total thickness of the antiglare layer on the substrate: about 10.5 μm)

EXAMPLE 4

Formation of Under Coat Rough Surface Layer

Using a biaxial stretching polyethylene terephthalate film (manufactured by TOYOBO Co., Ltd., trade name "A4300") having a thickness of 100 μm as a transparent substrate, the composition 2 for an under coat rough surface layer was applied onto the film with a wire wound rod for coating (Mayer bar (metering coating rod)) #14, and the applied composition 2 was heated to dry for 1 minute in an oven of 70° C. to evaporate the solvent fraction, and then a coat was cured by irradiating the coat with ultraviolet light in such a way that an exposure becomes 30 mJ to form an under coat rough surface layer.

Formation of Surface Adjustment Layer

Furthermore, the composition 2 for a surface adjustment layer was applied onto the under coat rough surface layer with a wire wound rod for coating (Mayer bar (metering coating rod)) #10, and the applied composition 2 was heated to dry for 1 minute in an oven of 70° C. to evaporate the solvent fraction, and then a coat was cured by irradiating the coat with ultraviolet light in such a way that an exposure becomes 100 mJ under nitrogen purge (oxygen content 200 ppm or less) to form a surface adjustment layer to obtain an antiglare optical layered body. (The total thickness of the antiglare layer on the substrate: about 15.0 μm)

EXAMPLE 5

Formation of Antiglare Layer

Using a triacetyl cellulose film (TD 80U, manufactured by FUJIFILM Corporation) having a thickness of 80 μm as a transparent substrate, the composition 8 for a single antiglare layer was applied onto the film with a wire wound rod for coating (Mayer bar (metering coating rod)) #6, and the applied composition 8 was heated to dry for 1 minute in an oven of 70° C. to evaporate the solvent fraction, and then a coat was cured by irradiating the coat with ultraviolet light in such a way that an exposure becomes 100 mJ under nitrogen purge (oxygen content 200 ppm or less) to form an antiglare optical layered body. Use of the fine particle, in which a difference in refractive indexes between the fine particle and the binder resin was up to 0.09, in the under coat antiglare layer made it possible to exert an internal diffusion effect and to prevent scintillation more effectively. (The total thickness of the antiglare layer on the substrate: 2.6 μm)

EXAMPLE 6

Formation of Antiglare Layer

Using a triacetyl cellulose film (TD 80U, manufactured by FUJIFILM Corporation) having a thickness of 80 μm as a transparent substrate, the composition 1 for a single antiglare layer was applied onto the film with a wire wound rod for coating (Mayer bar (metering coating rod)) #6, and the applied composition 1 was heated to dry for 1 minute in an oven of 70° C. to evaporate the solvent fraction, and then a coat was cured by irradiating the coat with ultraviolet light in such a way that an exposure becomes 100 mJ under nitrogen purge (oxygen content 200 ppm or less) to form an antiglare optical layered body. Use of the fine particle, in which a difference in refractive indexes between the fine particle and the binder resin was up to 0.09, in the under coat antiglare layer made it possible to exert an internal diffusion effect and to prevent scintillation more effectively. (The total thickness of the antiglare layer on the substrate: about 5 μm)

EXAMPLE 7

Production of Emboss Roller

A roller made of iron was made available and beads shot was carried out for the surface of the roller using glass beads of 100 mesh (particle size distribution; 106 μm to 150 μm) to form peak and valley shape and the obtained rough surface was plated with chromium in a thickness of 5 μm to obtain an emboss roller. At the time of beads shot, the blowing pressure and the interval between a spraying nozzle and the roller were adjusted to produce the emboss roller matched with the optical characteristics of the surface roughness of the antiglare layer of the optical layered body of the present invention.

Formation of Primer Layer

Using a composition obtained by mixing a polyurethane resin primer coating composition (manufactured by The INCTEC Inc., medium main agent for chemical mat varnish, curing agent (XEL curing agent (D))) in a solvent at a weight ratio of main agent/curing agent/solvent of 10/1/3.3, a polyethylene terephthalate resin film (manufactured by TOYOBO Co., Ltd., trade name; A4300) having a thickness of 100 μm was subjected to gravure coating and dried to form a primer layer having a thickness of 3 μm. As a solvent, a mixed solvent of toluene and methyl ethyl ketone mixed in the proportion of 1:1 was used.

Formation of Antiglare Layer

Figure 1A:
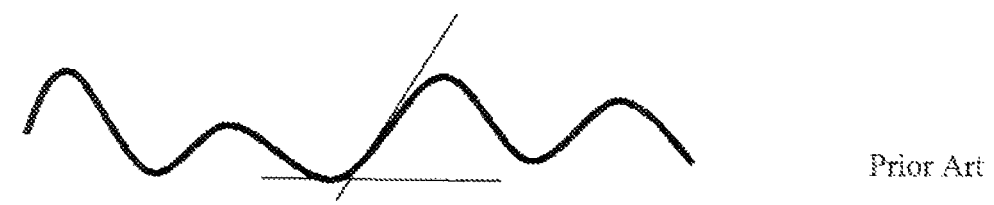
FIG. 1a is a schematic diagram of a cross section of the surface of a conventional antiglare layer.
Figure 1B:
FIG. 1b is a schematic diagram of a cross section of the surface of an antiglare layer of the present invention.
Figure 2A:
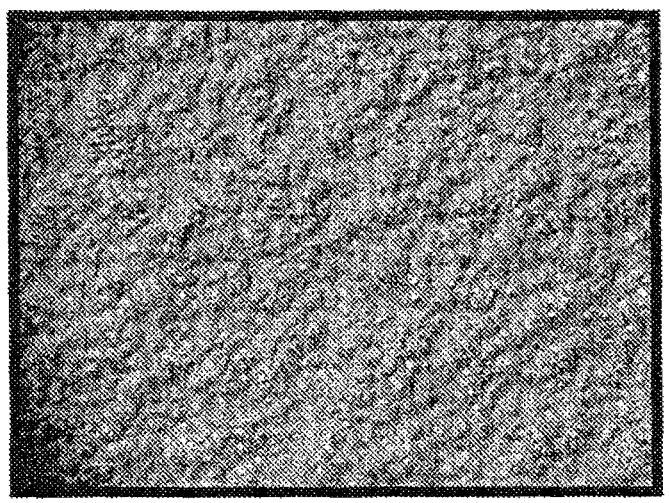
FIG. 2a is an optical microscope photograph of the surface of a conventional antiglare layer.
Figure 2B:
FIG. 2b is an optical microscope photograph of the surface of an antiglare layer of the present invention.
Figure 3:
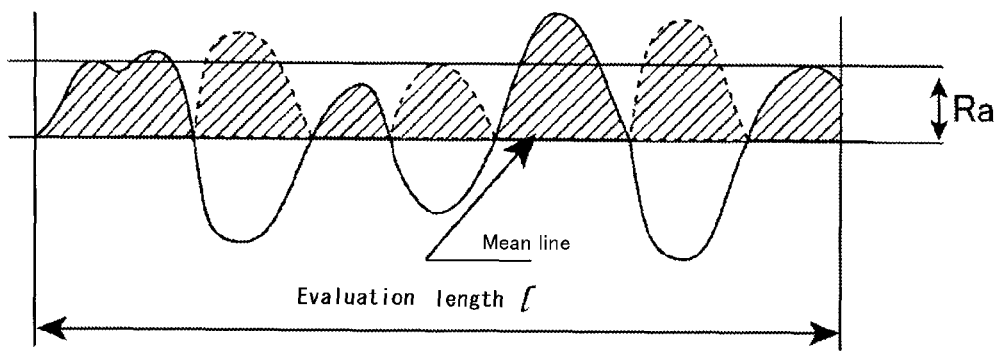
FIG. 3 is a schematic view for illustrating a calculation method of Ra.
Figure 4:
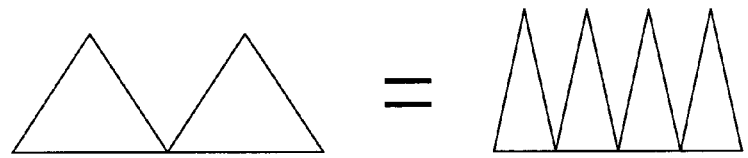
FIG. 4 is a schematic view of surface roughness of an antiglare layer.
Figure 4:
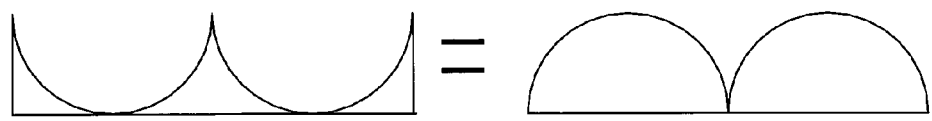
Figure 5:
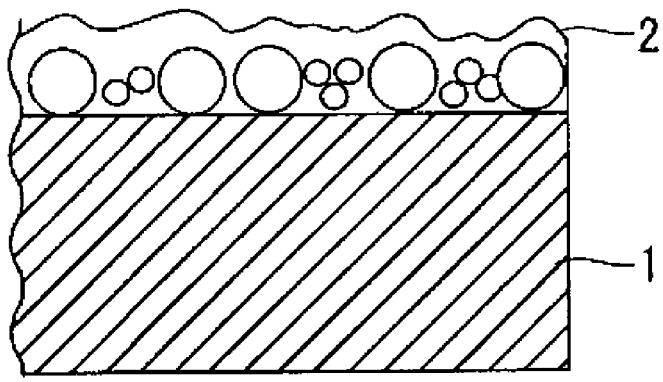
FIG. 5 is a schematic sectional view of an optical layered body according to the present invention.
Figure 6:
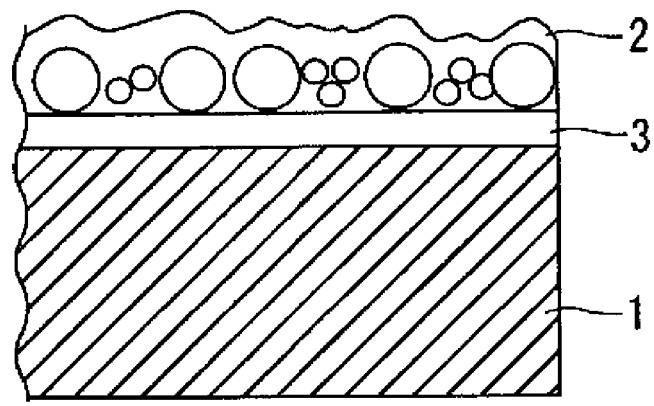
FIG. 6 is a schematic sectional view of an optical layered body according to the present invention.
Figure 7:
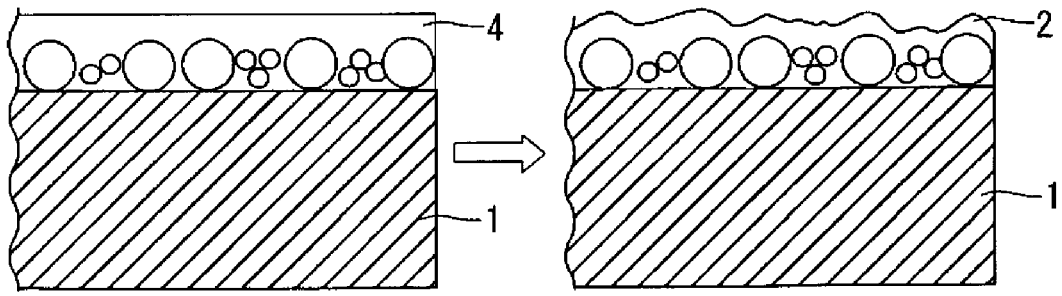
FIG. 7 is a schematic sectional view of an optical layered body according to the present invention.
Figure 8:
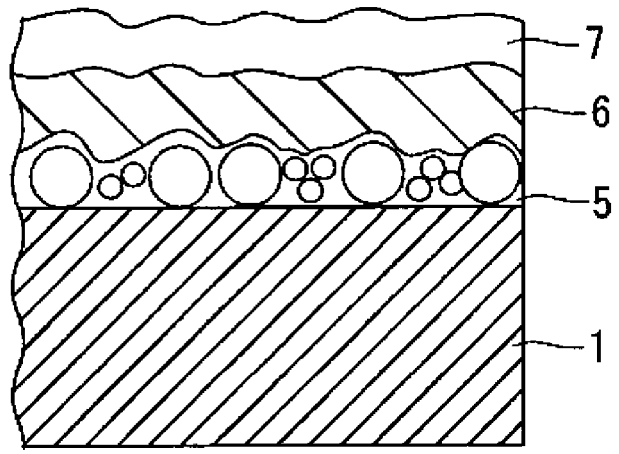
FIG. 8 is a schematic sectional view of an optical layered body according to the present invention.
Figure 9:
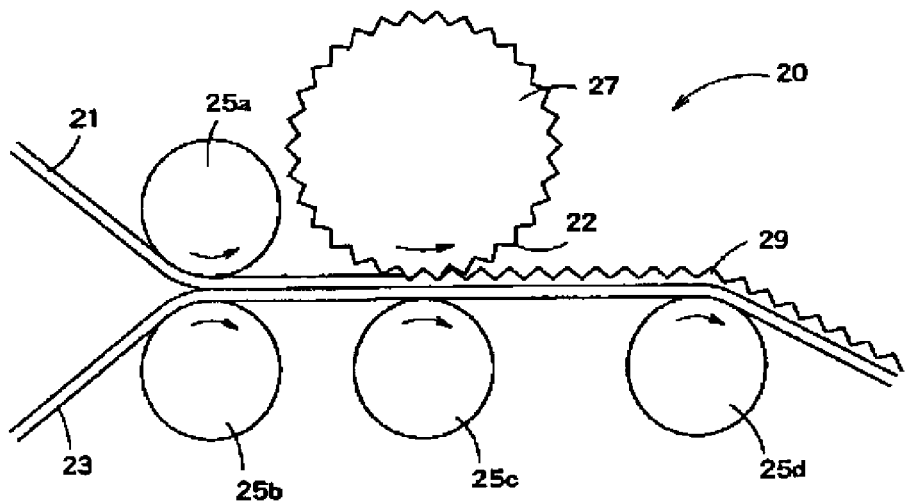
FIG. 9 is an example of a production apparatus of an optical layered body of the present invention.
Figure 10:
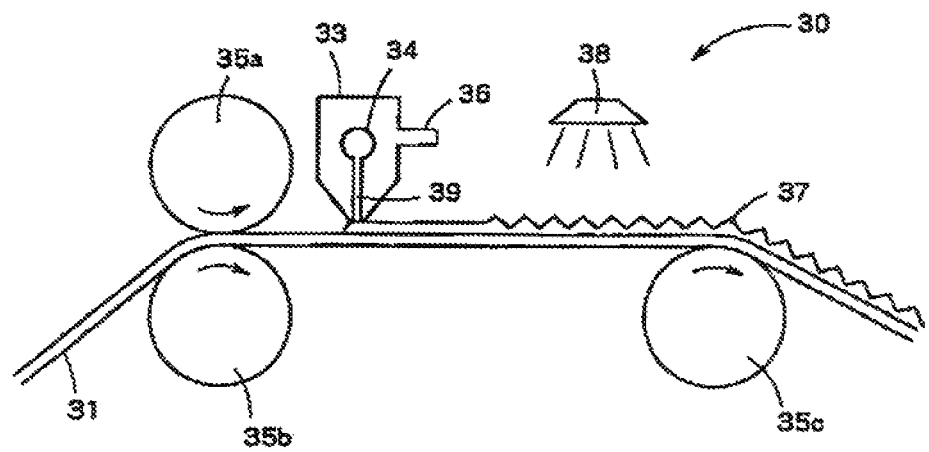
FIG. 10 is an example of a production apparatus of an optical layered body of the present invention.
Figure 11:
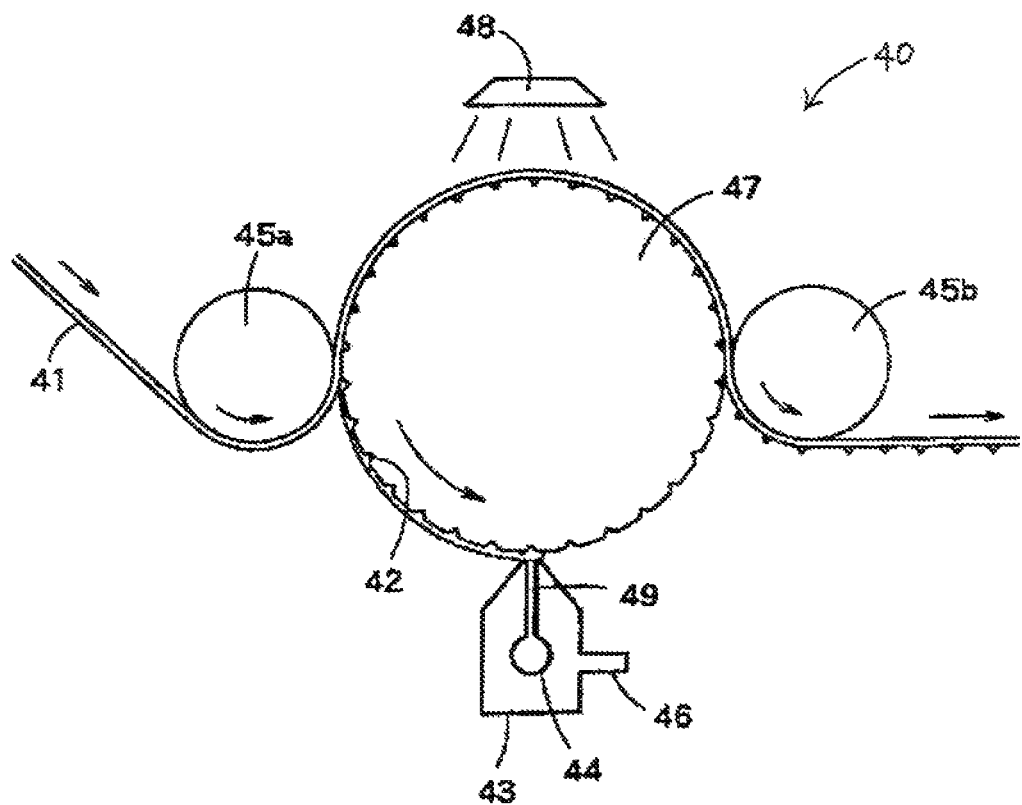
FIG. 11 is an example of a production apparatus of an optical layered body of the present invention.
Figure 12:
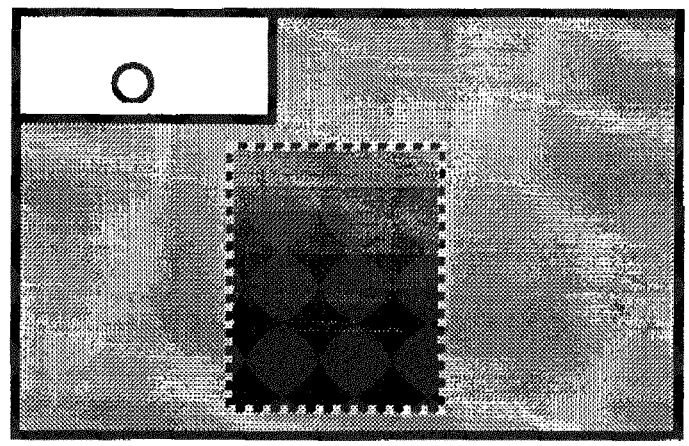
FIG. 12 is a schematic view showing a measuring method of antiglare properties.
Figure 12:
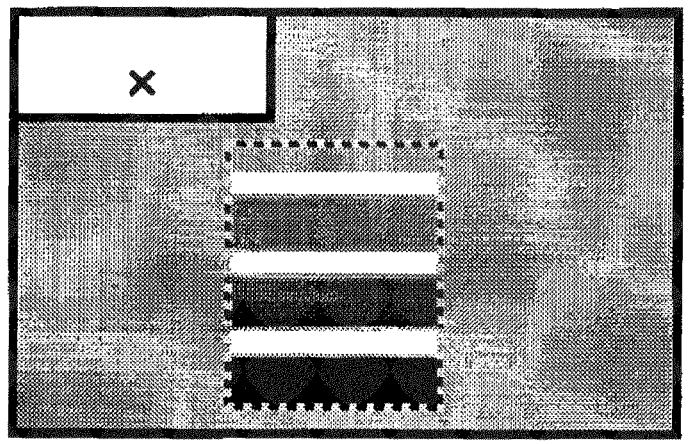
Figure 13:
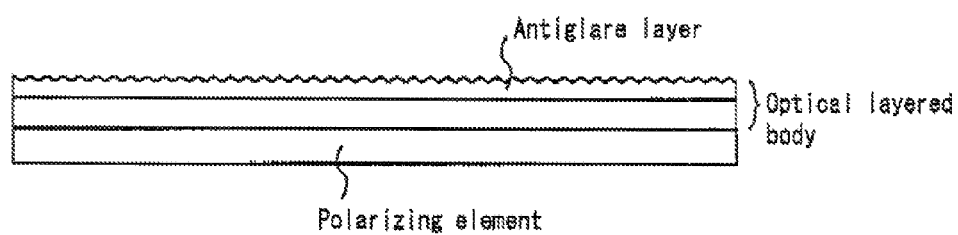
FIG. 13 is a schematic view of a polarizer comprising a polarizing element and an optical layered body according to the present invention on the surface of the polarizing element opposed to a face where the antiglare layer in the optical layered body is present.

The produced emboss roller was provided in the fourth production apparatus (emboss apparatus 47) of the present invention shown in FIG. 10, and the prepared composition 6 for a single antiglare layer was supplied to a liquid storage of a coating head. The liquid storage was constantly kept at 40° C. Next, the polyethylene terephthalate resin film, on which the primer layer had been formed, was supplied to the emboss roller. The composition 6 for a single antiglare layer was applied to the emboss roller and the polyethylene terephthalate resin film was overlapped on the composition and formed using a rubber roller and successively ultraviolet light in an intensity of 200 mJ was radiated from the film side using an ultraviolet light source for curing and the coating was separated from the emboss roller to form an antiglare layer. (total thickness of the antiglare layer on the substrate: about 15 μm)

EXAMPLE 8

Formation of Antiglare Layer

Using a triacetyl cellulose film (TD 80U, manufactured by FUJIFILM Corporation) having a thickness of 80 μm as a transparent substrate, the composition 5 for a single antiglare layer was applied onto the film with a wire wound rod for coating (Mayer bar (metering coating rod)) #24, and the applied composition 5 was heated to dry for 2 minutes in an oven of 80° C. to evaporate the solvent fraction and to form a phase separation type rough surface layer by spinodal decomposition from a liquid phase, and then a coat was cured by irradiating the coat with ultraviolet light in such a way that an exposure becomes 100 mJ to form an antiglare layer. (The total thickness of the antiglare layer on the substrate: about 8.0 μm)

EXAMPLE 9

Formation of Under Coat Rough Surface Layer

Using a triacetyl cellulose film (TD 80U, manufactured by FUJIFILM Corporation) having a thickness of 80 μm as a transparent substrate, the composition 6 for an under coat rough surface layer was applied onto the film with a wire wound rod for coating (Mayer bar (metering coating rod)) #14, and the applied composition 6 was heated to dry for 1 minute in an oven of 70° C. to evaporate the solvent fraction, and then a coat was cured by irradiating the coat with ultraviolet light in such a way that an exposure becomes 30 mJ to form an undercoat rough surface layer. Use of the fine particle, in which a difference in refractive indexes between the fine particle and the binder resin was up to 0.09, in the under coat rough surface layer made it possible to exert an internal diffusion effect and to prevent scintillation more effectively.

Formation of Surface Adjustment Layer

Furthermore, the composition 3 for a surface adjustment layer was applied onto the under coat rough surface layer with a wire wound rod for coating (Mayer bar (metering coating rod)) #16, and the applied composition 3 was heated to dry for 1 minute in an oven of 70° C. to evaporate the solvent fraction, and then a coat was cured by irradiating the coat with ultraviolet light in such a way that an exposure becomes 100 mJ under nitrogen purge (oxygen content 200 ppm or less) to form a surface adjustment layer to obtain an antiglare optical layered body. (The total thickness of the antiglare layer on the substrate: 16 μm)

COMPARATIVE EXAMPLE 1

Formation of Antiglare Layer

Using a triacetyl cellulose film (TD 80U, manufactured by FUJIFILM Corporation) having a thickness of 80 μm as a transparent substrate, the composition 2 for a single antiglare layer was applied onto the film with a wire wound rod for coating (Mayer bar (metering coating rod)) #6, and the applied composition 2 was heated to dry for 1 minute in an oven of 70° C. to evaporate the solvent fraction, and then a coat was cured by irradiating the coat with ultraviolet light in such a way that an exposure becomes 100 mJ under nitrogen purge (oxygen content 200 ppm or less) to form an antiglare optical layered body. In this antiglare layer, silica particles were agglomerated within the binder, and the agglomerated lumps of silica and the silica remaining dispersed form the surface roughness. (The total thickness of the antiglare layer on the substrate: about 3 μm)

COMPARATIVE EXAMPLE 2

Formation of Antiglare Layer

Using a triacetyl cellulose film (TD 80U, manufactured by FUJIFILM Corporation) having a thickness of 80 μm as a transparent substrate, the composition 3 for a single antiglare layer was applied onto the film with a wire wound rod for coating (Mayer bar (metering coating rod)) #8, and the applied composition 3 was heated to dry for 1 minute in an oven of 70° C. to evaporate the solvent fraction, and then a coat was cured by irradiating the coat with ultraviolet light in such a way that an exposure becomes 100 mJ under nitrogen purge (oxygen content 200 ppm or less) to form an antiglare optical layered body. (The total thickness of the antiglare layer on the substrate: about 3.8 μm)

COMPARATIVE EXAMPLE 3

Formation of Antiglare Layer

Using a triacetyl cellulose film (TD 80U, manufactured by FUJIFILM Corporation) having a thickness of 80 μm as a transparent substrate, the composition 3 for an under coat rough surface layer was used as a composition for an antiglare layer and was applied onto the film with a wire wound rod for coating (Mayer bar (metering coating rod)) #12, and the applied composition 3 was heated to dry for 1 minute in an oven of 70° C. to evaporate the solvent fraction, and then a coat was cured by irradiating the coat with ultraviolet light in such a way that an exposure becomes 100 mJ under nitrogen purge (oxygen content 200 ppm or less) to form an antiglare optical layered body. Use of the fine particle, in which a difference in refractive indexes between the fine particle and the binder resin was up to 0.09, in the antiglare layer made it possible to exert an internal diffusion effect and to prevent scintillation. This antiglare layer has an appearance in which fine particles stuck their tops out of the binder resin. (The total thickness of the antiglare layer on the substrate: about 4.5 μm)

COMPARATIVE EXAMPLE 4

Formation of Antiglare Layer

Using a triacetyl cellulose film (TD 80U, manufactured by FUJIFILM Corporation) having a thickness of 80 μm as a transparent substrate, the composition 4 for a single antiglare layer was applied onto the film with a wire wound rod for coating (Mayer bar (metering coating rod)) #8, and the applied composition 4 was heated to dry for 1 minute in an oven of 70° C. to evaporate the solvent fraction, and then a coat was cured by irradiating the coat with ultraviolet light in such a way that an exposure becomes 100 mJ under nitrogen purge (oxygen content 200 ppm or less) to form an antiglare optical layered body. (The total thickness of the antiglare layer on the substrate: about 4 μm)

COMPARATIVE EXAMPLE 5

Formation of Antiglare Layer

Using a triacetyl cellulose film (TD 80U, manufactured by FUJIFILM Corporation) having a thickness of 80 μm as a transparent substrate, the composition 7 for a single antiglare layer was applied onto the film with a wire wound rod for coating (Mayer bar (metering coating rod)) #34, and the applied composition 7 was heated to dry for 1 minute in an oven of 70° C. to evaporate the solvent fraction, and then a coat was cured by irradiating the coat with ultraviolet light to the coat in such away that an exposure becomes 100 mJ under nitrogen purge (oxygen content 200 ppm or less) to form an antiglare optical layered body. (The total thickness of the antiglare layer on the substrate: about 23 μm)

COMPARATIVE EXAMPLE 6

Formation of Under Coat Rough Surface Layer

Using a triacetyl cellulose film (TD 80U, manufactured by FUJIFILM Corporation) having a thickness of 80 μm as a transparent substrate, the composition 5 for an under coat rough surface layer was applied onto the film with a wire wound rod for coating (Mayer bar (metering coating rod)) #8, and the applied composition 5 was heated to dry for 1 minute in an oven of 70° C. to evaporate the solvent fraction, and then a coat was cured by irradiating the coat with ultraviolet light in such a way that an exposure becomes 30 mJ to form an undercoat rough surface layer. This under coat rough surface layer has an appearance in which fine particles stuck their heads out of the binder resin.
Formation of Surface Adjustment Layer Furthermore, the composition 1 for a surface adjustment layer was applied onto the under coat rough surface layer with a wire wound rod for coating (Mayer bar (metering coating rod)) #24, and the applied composition 1 was heated to dry for 1 minute in an oven of 70° C. to evaporate the solvent fraction, and then a coat was cured by irradiating the coat with ultraviolet light in such a way that an exposure becomes 70 mJ under nitrogen purge (oxygen content 200 ppm or less) to form a surface adjustment layer to obtain an antiglare optical layered body. (The total thickness of the antiglare layer on the substrate: about 21.5 μm)

The obtained optical layered bodies of Examples and Comparative Examples were evaluated according to the following evaluation method.
Surface Roughness Surface roughness (Sm, θa, Rz) was measured according to the definitions of the present description and the results of measurements are shown in Table 3.
Haze Haze values (%) of the optical layered bodies of Examples and Comparative Examples were measured according to the following procedure and the results of measurements are shown in Table 3.

The haze value can be measured according to JIS K-7136. Examples of the equipment used for measurement include a reflection and transmittance meter HR-150 (manufactured by Murakami Color Research Laboratory Co., Ltd.). The haze is measured with the coated surface directed to a light source.

Surface haze can be measured in the following manner. A resin solution prepared by diluting a resin (including resin components such as monomer and oligomer) such as pentaerythritol triacrylate with toluene so as to be 60% in solid content is applied onto the surface roughness of the outermost surface of the optical layered body in such a way that a dried film thickness is 8 μm with a wire bar. Accordingly, the surface roughness of the antiglare layer are buried and the outermost layer becomes a smooth layer. when a composition constituting the optical layered body contains a leveling agent and therefore a re-coating agent tends to be repelled and hard to become wet, an antiglare film may previously be subjected to a saponification treatment (film is immersed in a 2 mol/liter NaOH (or KOH) solution of 55° C. for 3 minutes, and then the film is washed with water and the water droplets are wiped thoroughly with Kim-Wipe, and then the film is dried in an oven of 50° C. for 1 minute) to carry out a hydrophilic treatment. This film with the leveled surface becomes a state of not having haze due to the surface roughness but having only internal haze. This haze can be determined as an internal haze. Then, by subtracting the internal haze from haze (total haze) of the original film, haze (surface haze) resulting from only the surface roughness is determined.
Layer Thickness H–R Layer thickness H–R (μm) was measured on the optical layered bodies of Examples and Comparative Examples according to the definition of the present description and the results of measurements are shown in Table 3. When many kinds of fine particles (R1, R2, R3) are used, R represents a particle diameter of the particle having the largest particle size.
Gloss Blackness Test A cross-Nicol polarizer was bonded to the side opposite to a film face of the optical layered bodies of Examples and Comparative Examples, and then a sensory test (visually observed at an about 45° angle to the sample at a position about 50 cm above the sample) was carried out using a three-wavelength fluorescent lamp (irradiated at a 45° angle to the sample) of 30 W to evaluate the gloss blackness in detail according to the following criteria.
Evaluation Criteria
Evaluation Good: Gloss black color can be reproduced.
Evaluation Poor Gloss black color cannot be reproduced.
Sensory Test Method of Antiglare Property A backside of a surface treated film was subjected to a tackiness treatment and this film was stuck on a black acrylic plate to form a sample for evaluation. A black-white 20 mm-wide stripe plate was prepared. The reflection of the stripe located at 30° from a normal line of the sample in the above-mentioned sample (inclined 30° upward) was observed. Illumination of a sample face was set at 250 lux and brightness (white) of the stripe was set at 65 cd/cm². Further, a distance between the stripe plate and the sample was 1.5 m and a distance between the sample and an observer was 1 m. How the reflection of the sample is seen in the film by the observer was rated according to the following criteria.
Good: Stripe cannot be recognized.
Poor: Stripe can be recognized.
Evaluation; Scintillation Test A black matrix pattern plate (105 ppi, 140 ppi) formed on a 0.7 mm-thick glass was placed on a viewer (LIGHT VIEWER 7000PRO) manufactured by HAKUBA Photo Industry Co., Ltd. with a patterned surface down, and the resulting optical layered body film was placed thereon with a peak and valley face up (air side), and dazzle was visually observed and evaluated while pressing a film edge down lightly to avoid to float the film in a dark room.
Evaluation Criteria
Evaluation Excellent: There is no dazzle at 140 ppi and the film is good.
Evaluation Good There is no dazzle at 105 ppi and the film is good.
Evaluation Poor There is dazzle at 105 ppi and the film is bad.

TABLE 3

| | Evaluation 1 | | | | | | | | Evaluation 2 | Evaluation 3 | |
| | Total Haze(%) | Internal Haze(%) | Surface Haze(%) | Surface roughness | | | H-R (μm) | R μm | Gloss blackness | Antiglare property | Evaluation 4 Scintillation |
| | | | | Sm | θa | Rz | | | | | |
|---|---|---|---|---|---|---|---|---|---|---|---|
| Example 1 | 1.0 | 0 | 1 | 89.0 | 0.429 | 0.3721 | 7.0 | 9.5 | Good | Good | Excellent |
| Example 2 | 5.0 | 1 | 4 | 81.1 | 0.59 | 0.322 | 5.0 | 7.5 | Good | Good | Excellent |
| Example 3 | 29.6 | 26.0 | 3.6 | 52.5 | 0.89 | 0.412 | 3.5 | 7.0 | Good | Good | Excellent |
| Example 4 | 1.1 | 0 | 1.1 | 99.0 | 0.414 | 0.312 | 5.5 | 9.5 | Good | Good | Good |
| Example 5 | 17.1 | 15.7 | 1.4 | 65 | 0.49 | 0.56 | 0.6 | 2.0 | Good | Good | Excellent |
| Example 6 | 30.0 | 26 | 4.0 | 98.3 | 0.998 | 1 | 1.5 | 3.5 | Good | Good | Excellent |
| Example 7 | 1.9 | 0 | 1.9 | 98.7 | 0.493 | 0.832 | not using particles | not using particles | Good | Good | Good |
| Example 8 | 0.9 | 0 | 0.9 | 92.3 | 0.445 | 0.42 | not using particles | not using particles | Good | Good | Good |
| Example 9 | 59.9 | 55.3 | 4.6 | 67.2 | 0.8 | 0.552 | 9 | 7.0 | Good | Good | Excellent |
| Comparative Example 1 | 20.2 | 0 | 20.2 | 47.6 | 4.471 | 3.47 | 0.1 to 0.3 | average 1.5 | Poor | Good | Poor |
| Comparative Example 2 | 18.6 | 9.6 | 9.0 | 57.1 | 1.464 | 0.987 | 0.3 | 3.5 | Poor | Good | Good |
| Comparative Example 3 | 37.8 | 26.5 | 11.3 | 40.7 | 9.097 | 4.317 | 0 | 7 | Poor | Good | Good |
| Comparative Example 4 | 28.0 | 15 | 13 | 70.5 | 1.2 | 1.512 | 0.5 | 3.5 | Poor | Good | Good |
| Comparative Example 5 | 15.4 | 14.2 | 1.2 | 332.7 | 1.037 | 1.131 | 19.5 | 3.5 | Good | Poor | Excellent |
| Comparative Example 6 | 14.3 | 13.8 | 1.2 | 316.2 | 0.381 | 0.3 | 18 | 3.5 | Good | Poor | Excellent |

When mixed particles are used, a maximum particle diameter is described as R.

It was shown that the optical layered body obtained according to the present invention has an excellent antiglare property and excellent gloss blackness simultaneously.

INDUSTRIAL APPLICABILITY

The method for producing an optical layered body and the production apparatus of an optical layered body of the present invention can be used as a method for producing antireflection films of cathode ray tube (CRT) display devices, liquid crystal displays (LCD), plasma displays (PDP), electroluminescence displays (ELD) and the like and a production apparatus of these antireflection films.

The invention claimed is:

1. An optical layered body having a light-transmitting substrate and an antiglare layer provided on the light-transmitting substrate,
   wherein the antiglare layer has a surface roughness at its outermost surface, and is formed by using a composition for an antiglare layer, containing a resin and fine particles, and a difference (n) in refractive indexes between the resin and the fine particle is 0.2 or less,
   the surface roughness is a gradual surface roughness which is defined by Sm, θa and Rz and the gradual surface roughness means a shape in which peaks are like hills with gentle slope and on the other hand, valleys are nearly flat rather than a valley configuration because the valleys are extremely gradual valleys compared with peaks, and
   when denoting a mean spacing of profile irregularities of the optical layered body by Sm, a mean inclination angle of profile irregularities by θa, and a mean roughness of the surface roughness by Rz,
   Sm is 50 μm or more and less than 100 μm,
   θa is 0.1° or more and 1.0° or less, and
   Rz is more than 0.2 μm and 1.0 μm or less, and wherein the antiglare layer comprises an under coat rough surface layer and a surface adjustment layer provided on the under coat rough surface layer, wherein the surface adjustment layer is 1.5 μm or more and 15 μm or less.

2. The optical layered body according to claim 1, wherein the fine particle is an inorganic fine particle or an organic fine particle.

3. The optical layered body according to claim 1, wherein the fine particle is an agglomerated type fine particle.

4. The optical layered body according to claim 1, wherein the fine particle has an average particle diameter R of 1.0 μm or more and 20 μm or less.

5. The optical layered body according to claim 1, wherein in the antiglare layer, a difference "H–R" between a layer thickness H μm of the antiglare layer and an average particle diameter R μm of the fine particles is 0.6 μm or more and 15.0 μm or less.

6. The optical layered body according to claim 1,
wherein the fine particle has a particle size distribution in which 80% of the total number of the fine particles falls within an average particle diameter R of the fine particles±1.0 μm.

7. The optical layered body according to claim 1,
wherein in the antiglare layer, when the total weight per unit surface area of the fine particles is denoted by m and the total weight per unit surface area of the resin is denoted by M, a weight ratio (m/M) is 0.01 or more and 1.2 or less.

8. The optical layered body according to claim 1,
wherein the resin contains an ionizing radiation-curable resin and/or a thermosetting resin.

9. The optical layered body according to claim 1,
wherein the antiglare layer further contains an antistatic agent.

10. The optical layered body according to claim 9,
wherein the antistatic agent is a conductive fine particle and/or a conductive polymer.

11. The optical layered body according to claim 1,
which further comprises a low refractive index layer on the antiglare layer.

12. The optical layered body according to claim 11,
wherein the low refractive index layer contains hollow silica.

13. The optical layered body according to claim 1,
wherein an internal haze value is 60 or less.

14. A polarizer comprising a polarizing element,
wherein the optical layered body according to claim 1 is provided on the surface of the polarizing element opposed to a face where the antiglare layer in the optical layered body is present.

15. An image display device comprising a light-transmitting display and a light source apparatus to irradiate the light-transmitting display from the backside,
wherein the image display device comprises the optical layered body according to claim 1 or a polarizer comprising a polarizing element, wherein said optical layered body is provided on the surface of the polarizing element opposed to a face where the antiglare layer in the optical layered body is present, at the surfaces of the light-transmitting display.

* * * * *